United States Patent
Fleming-Dahl

(10) Patent No.: US 6,611,794 B1
(45) Date of Patent: Aug. 26, 2003

(54) SIGNAL AMPLITUDE RESTORATION APPARATUS AND METHOD

(75) Inventor: Arthur Fleming-Dahl, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 194 days.

(21) Appl. No.: 09/634,060

(22) Filed: Aug. 9, 2000

Related U.S. Application Data

(60) Provisional application No. 60/198,564, filed on Apr. 20, 2000.

(51) Int. Cl.[7] ............................. G06F 15/00; H03F 1/26; H04B 15/00; G01R 29/26

(52) U.S. Cl. ...................... 702/191; 702/190; 324/614

(58) Field of Search ................................. 702/191, 190, 702/189, 194, 195, 181; 375/227, 341, 345; 324/614; 342/358, 357.12; 455/226.3, 245.1, 308; 380/263

(56) References Cited

U.S. PATENT DOCUMENTS

| | | | | |
|---|---|---|---|---|
| 4,901,150 A | * | 2/1990 | Klingelhofer et al. | 348/618 |
| 5,351,274 A | | 9/1994 | Chennakeshu et al. | 375/100 |
| 5,379,346 A | | 1/1995 | Pecora et al. | 380/263 |
| 5,432,697 A | | 7/1995 | Hayes | 700/38 |
| 5,473,694 A | | 12/1995 | Carroll et al. | 380/263 |
| 5,510,976 A | | 4/1996 | Tanaka et al. | 700/54 |
| 5,680,462 A | | 10/1997 | Miller et al. | 380/263 |
| 5,748,851 A | | 5/1998 | Iokibe et al. | 706/58 |
| 5,982,235 A | * | 11/1999 | Kinomura | 330/279 |
| 6,021,156 A | * | 2/2000 | Wagner | 375/148 |
| 6,226,335 B1 | * | 5/2001 | Prozorov | 375/344 |
| 6,370,210 B1 | * | 4/2002 | Yamamoto | 375/345 |

FOREIGN PATENT DOCUMENTS

| | | | |
|---|---|---|---|
| EP | 0814569 A1 | 12/1997 | ............ H04B/1/10 |
| EP | 0875989 A2 | 4/1998 | ............ H03G/3/30 |
| WO | 96/06494 | 2/1996 | |
| WO | 99/49588 | 9/1999 | ............ H04B/7/005 |
| WO | 00/72541 A1 | 11/2000 | ............ H04L/27/00 |
| WO | 01/15401 A1 | 3/2001 | ............ H04L/27/06 |

OTHER PUBLICATIONS

Fleming–Dahl, A., "A Chaotic Communication System with a Receiver Estimation Engine", Jun. 1998, Georgia Institute of Technology, pp. 103–164.*

"Noise and Synchronization in Chaotic Systems" by G. Malescio. The American Physical Society vol. 53 No. 6 Jun. 1996 (pp. 6551–6554) Revised manuscript received Nov. 3, 1995.

"Current Problems for the Transmission of Information Using a Chaotic Signal" by Martin Hasler 1997 IEEE (pp. 195–200).

(List continued on next page.)

Primary Examiner—Marc S. Hoff
Assistant Examiner—Mary Catherine Baran
(74) Attorney, Agent, or Firm—Baker Botts, L.L.P.

(57) ABSTRACT

An apparatus for signal amplitude restoration has a received signal input and a scaled received signal output. An amplitude correction factor generator has an estimated signal-to-noise power ratio input and a received signal input. A variable gain amplifier uses the correction factor generator output to control its gain, and amplifies or attenuates the received signal input to provide the scaled received signal output. An average SNR estimator uses the amplifier output as its input, and provides an output connected to the estimated signal-to-noise power ratio input. The apparatus processes received signals in an iterative fashion, such that at least one of the outputs is stored for use as a feedback input during later iterations.

27 Claims, 7 Drawing Sheets

OTHER PUBLICATIONS

"The Role of Synchronization in Digital Communications Using Chaos—Part 1: Fundamentals of Digital Communications" by Géza Kolumbán, Michael Peter Kennedy, and Leon O. Chua. 1997 IEEE vol. 44 No. 10 Oct. 1997 (pp. 927–936).

"Multichannel Communication Using Autosynchronization" by U. Parlitz and L. Kocarev. International Journal of Bifurcation and Chaos, vol. 6, No. 3 (1996) (pp. 581–587) Received Sep. 21, 1995.

"Chaotic Communications in the Presence of Noise" by Dr. Richard H. Sherman and Jeff Gullicksen. SPIE vol. 2038 Chaos in Communications (1993) (pp. 141–151).

"Robustness and Signal Recovery in a Synchronized Chaotic System" by Kevin M. Cuomo, Alan V. Oppenheim and Steven H. Strogatz. (pp. 81–97).

"Secure Communication via Chaotic Parameter Modulation" by Tao Yang and Leon O. Chua. IEEE Transactions on Circuits and Systems—I: Fundamental Theory and Applications, vol. 43 No. 9 Sep. 1996 (pp. 817–819).

"Coding, Channel Capacity, and Noise Resistance in Communicating with Chaos" by Erik Bollt, Ying–Cheng Lai, and Celso Grebogi. Physical Review Letters vol. 79 No. 19 Nov. 10, 1997 (pp. 3787–3790) Received May 15, 1997.

"Overview of Chaos and Communications Research" by Louis M. Pecora. SPIE vol. 2038 Chaos in Communications (1993) (pp. 2–21).

"Chaos Shift Keying: Modulation and Demodulation of a Chaotic Carrier using Shelf–Synchronizing Chua's Circuits" by Herevé Dedieu. IEEE Transactions on Circuits and Systems—II: Analog and Digital Signal Processing vol. 40 No. 10 Oct. 1993 (pp. 634–641).

"Coding Information in the Natural Complexity of Chaos" by Scott Hayes and Celso Grebogi. SPIE vol. 2038 Chaos in Communications (1993) (pp. 153–160).

"Controlling Symbolic Dynamics for Communication" by Scott Hayes, Celso Grebogi, Edward Ott, and Andrea Mark. (pp. 122–129).

"Secure Communication Using Chaotic Synchronization" by Philip Downes. SPIE vol. 2038 Chaos in Communications (1993) (pp. 227–234).

"Secure Communications and Unstable Periodic Orbits of Strange Attractors" by Henry D. I. Abarbanel and Paul S. Linsay. IEEE Transactions on Circuits and Systems—II: Analog and Digital Signal Processing, vol. 40 No. 10 Oct. 1993 (pp. 643–645).

"Synchronizing Chaotic Systems" by Thomas L. Carroll and Louis M. Pecora. SPIE vol. 2038 Chaos in Communications (1993) (pp. 34–42).

"Synchronizing Nonautonomous Chaotic Circuits" by Thomas L. Carroll and Louis M. Pecora. 1993 IEEE (pp. 646–649).

"A stochastic approach to spread spectrum communication using chaos" by Jörg Schweizer. SPIE vol. 2612 (pp. 115–124).

"Amplitude–Independent Chaotic Synchronization and Communication" by T.L. Carroll. SPIE vol. 2612 (pp. 181–187).

"Communication by Chaotic Signals: the Inverse System Approach" by Ute Feldmann, Martin Hasler and Wolfgang Schwarz. 1995 IEEE (pp. 680–683).

"Engineering Chaos for Encryption and Broadband Communication" by Martin Hasler. 1995 The Royal Society (pp. 115–125).

"View of Electronic Chaos Generation, control, and applications" by Maciej J. Ogorzalek. SPIE vol. 2612 (pp. 2–10).

"Unmasking a Modulated Chaotic Communications Scheme" by Kevin M. Short. International Journal of Bifurcation and Chaos, vol. 6 No. 2 (1996) (pp. 367–375) Revised Jun. 25, 1995.

"Using Filters For Chaotic Synchronization for Communications" by T.L. Carroll. 1995 IEEE (pp. 688–690).

"Digital Communications Using Controlled Chaos: Theory and Experiment" by Scott Hayes and Celso Grebogi. 1996 IEEE (pp. 170–173).

"Multiple Access Communications Using Chaotic Signals" by Jörg Schweizer and Martin Hasler. 1996 IEEE (pp. 108–111).

"Chaotic Coding and Cryptoanalysis" by Frank Dachselt, Kristina Kelber and Wolfgang Schwarz. 1997 IEEE (pp. 1061–1064).

"Communication With Chaos Via DSP Implementation" by Hiroyuki Kamata, Tetsuro Endo, and Yoshihisa Ishida. 1997 IEEE (pp. 1069–1072).

"Discrete Chaotic Cryptography" by Zbigniew Kotulski and Janusz Szczepański. Ann. Physik 6 (1997) (pp. 381–394) Received Jan. 13, 1997; accepted Feb. 20, 1997.

"Robust Communications Via Chaotic Synchronization Based on Contraction Maps" by Chang–song Zhou and Tian–lun Chen. Physics Letters A 225 (1997) (pp. 60–65) Accepted for publication Nov. 4, 1996.

"Secure Communication via One–dimensional Chaotic Inverse Systems" by Hong Zhou, Xie–Ting Ling, and Jun Yu. 1997 IEEE (pp. 1029–1032).

PCT Communication to PCT/US 01/12821 filed Apr. 20, 2001.

PCT International Search Report for PCT/US 01/12821 mailed May 7, 2002 (11 pages).

* cited by examiner

SIGNAL AMPLITUDE RESTORATION APPARATUS AND METHOD

RELATED APPLICATIONS

This application claims benefit of U.S. Provisional Application for U.S. Pat. No. 60/198,564 titled "Signal Amplitude Restoration Apparatus and Method" filed on Apr. 20, 2000, and is related to, U.S. patent application Ser. No. 09/382,523, titled "A Receiver Estimation Engine for a Chaotic System," which was filed on Aug. 25, 1999, and U.S. patent application Ser. No. 09/383,181, titled "Average Signal to Noise Ratio Estimator," which was also filed on Aug. 25, 1999. All applications are commonly assigned, and the subject matter of each of these related applications is incorporated herein by reference in its entirety.

BACKGROUND OF THE INVENTION

1. Technical Field

The present invention relates generally to apparatus and methods for processing information-bearing signals corrupted by noise. More particularly, the present invention relates to a signal processing apparatus and method which can be used to correct signal amplitude level variations, restoring them to receiver optimal design levels.

2. History of Related Art

Chaotic processes applied to information-bearing signals have properties that provide low probability of intercept (LPI) and low probability of detection (LPD), making them a natural choice as the foundation of communications systems. Chaotic signals have the prima facie appearance of noise for LPD, extreme sensitivity to initial conditions for LPI, and dynamics rendering receivers relatively intolerant of signal amplitude variations.

Communications systems based on chaotic processes have improved significantly in the decade since chaotic synchronization was first achieved. Several methods of synchronization combine with various modulation techniques to produce secure communication using signals in analog and digital form (e.g. Chua's circuit and chaotic maps, respectively). However, since chaotic processes are extremely sensitive to signal amplitude variation, chaotic receivers tend to lose synchronization and data recovery capabilities at variation levels as small as +/−3 dB. Thus, the inability to communicate beyond shouting distance has kept chaos-based communications systems in the laboratory.

There has been some work directed toward addressing this "distance problem", such as Tom Carroll's customized chaotic process that achieves amplitude-independent synchronization (see "Amplitude Independent Chaotic Synchronization and Communication," in *Chaotic Circuits for Communication*, Proceedings of the SPIE 2612, pp. 181–188, 1995). The need to customize chaos to achieve some degree of amplitude variation tolerance is a restrictive requirement, though, and an apparatus or method that works with an arbitrary or unrestricted chaotic process is highly desirable.

Since all communication systems are susceptible to interfering signals normally referred to as noise, the problem of chaotic signal reception can become even more difficult. Interfering signals may have harmful effects on the performance of any communication system, depending on the specific system being used, the nature of the noise, and the way the noise interacts with the signal. The magnitude of these effects is also determined by the relative intensity of the noise compared to the signal, which is usually measured as the signal-to-noise-ratio (SNR), or the ratio of the power of the signal to the power of the noise. Such effects are magnified with respect to chaotic systems, given the extreme sensitivity to signal level variation.

Communications receivers, which demodulate a signal to recover its information content, employ demodulation techniques whose designs are based on the statistics of both the signal and the corrupting noise. This approach has its roots in the Shannon channel capacity theorem, which states that channel capacity is a function of SNR. There are a variety of methods for the recovery of data corrupted by random noise, including maximum likelihood (ML) decision generators, also known as maximum a priori detectors; maximum a posteriori (MAP) detectors; minimum Euclidean distance calculators; correlation receivers; cross-correlation detectors; and matched filter detectors. While all techniques derive from the noise statistics, not all algorithms explicitly calculate noise power or SNR. Estimates of the noise power are typically used to derive SNR in order to estimate the quality of the receiver output; and they sometimes aid in the data recovery process, as with critical applications employing the MAP detector. Two examples of quality metrics calculated from SNR estimates are (1) a bit error rate (BER) and (2) a GPS navigation solution accuracy approximation.

Prior techniques of calculating SNR have involved various methods of estimating noise power and signal power individually, and dividing them to find the signal-to-noise ratio. For example, a binary phase-shift-key modulation technique or a direct sequence spread spectrum chipping code utilize a voltage for a logical one, and the negative of the voltage for a logical zero at baseband. Subtraction of sequential values is one method of estimating the noise content of such a received signal, and squaring the estimated noise voltages yields the noise power. Chaotic processes, however, associate a logical state with a noise-like sequence of values, rather than a single voltage level. This deterministically random characteristic of chaotic signals precludes the use of prior noise estimation methods, because the continuum of values corresponding to a logical state is not amenable to noise estimation methods that are based on the association of a constant quantity with a logical state. As a result, estimates of the individual signal power and noise power could not be made by conventional techniques.

The design of a new chaotic receiver utilizing a MAP detector requires knowledge of the noise statistics, specifically mean and power, so as to construct a window to superimpose on the chaotic transmit Probability Density Function (PDF). Investigation of the received PDF yielded observations of a relationship between received values and SNR. This relationship was developed and exploited to enable the estimation of SNR directly from received values, without the need to first estimate the individual signal and noise power values, solving the implementation dilemma for using a MAP detector with a chaotic receiver operating in a lossless channel.

Chaotic systems, however, have been observed to lose synchronization with as little as +/−3 dB amplitude variation, and so are intolerant of the propagation losses and processing losses and/or gains that are integral to real communications systems operating in lossy channels. The new SNR estimation method had no means of separating the signal power from the noise power. The receiver design was, therefore, relegated to the same status of laboratory curiosity as the other chaotic designs.

Thus a method and apparatus which enables the isolation of the message signal power from the noise power in a received signal, estimating the received message signal power deviations from receiver design values, generating a correction factor, and scaling the received signal to the proper level for optimal receiver operation would be highly beneficial. Such a method and apparatus would accurately adjust for signal attenuation and amplification via the correction factor so as to restore received signals to optimal levels, even in the face of amplitude deviations due to transmitter amplification and propagation losses. Even more beneficial would be the provision of a generalized technique, usable with receivers of linear, nonlinear, and/or nonlinear chaotic design. Such a method and apparatus would be most useful if the only a priori knowledge required to accomplish signal amplitude restoration were a transmit signal probability density function (PDF) and the optimum receiver design operational power level. Since the SNR is typically calculated in many communications applications, the apparatus and method might also make use of this ratio for estimating results such as message recovery fidelity, circular error probability for global positioning satellite systems (GPS), and receiver-feedback transmit power level control.

SUMMARY OF THE INVENTION

The apparatus of the present invention for signal amplitude restoration, having a received signal input and a scaled received signal output, includes an amplitude correction factor generator which has an estimated signal-to-noise power ratio input and a received signal input; a variable gain amplifier which uses the correction factor generator output to control its gain, and which amplifies or attenuates the received signal input to provide the scaled received signal output; and an average SNR estimator which uses the amplifier output as its input, and provides an output connected to the estimated signal-to-noise power ratio input. The apparatus and method operate to process received signals in an iterative fashion, such that at least one of the outputs is stored for use as a feedback input during later iterations.

The amplitude correction factor generator, in turn, is made up of a received power estimator connected to the received signal input, a message signal power estimator connected to the received power estimator and the estimated signal plus noise power ratio input, and a scaling correction factor generator connected to the message signal power estimator and the gain control of the amplifier. The average SNR estimator comprises, in turn, a SNR maximum likelihood estimator connected to the scaled received signal output, a received likelihood detector connected to the scaled received signal output and the SNR maximum likelihood estimator, and a running weighted averager connected to both the SNR maximum likelihood estimator and the received likelihood detector, so as to provide an output connected to the message signal power estimator (typically contained within the amplitude correction factor generator) and the SNR maximum likelihood estimator. A unit delay element is used to store the output of the running weighted averager as an input to the message signal power estimator on subsequent iterations.

The method of the present invention for providing a level-restored received signal output comprises the steps of providing a correction factor output to the gain control of a variable gain amplifier (connected to the received signal input), and providing an average signal-to-noise ratio (SNR) estimate using the level-restored received signal output and a stored running weighted average from a previous iteration of the method for feedback to a correction factor generator (which provides the correction factor output). The resulting average SNR estimate is stored as a new running weighted average for use in subsequent iterations of the method.

Providing a correction factor output may include estimating a signal plus noise power output as approximately equal to the summation of the received signal input squared over a preselected time interval window; estimating the signal power output as approximately equal to a product of the signal plus noise power output and the stored running weighted average divided by a quantity of one plus the stored running weighted average; and calculating the correction factor output as approximately inversely proportional to a square root of the signal power output, and most preferably, as approximately equal to a square root of the preselected receiver design power level divided by the square root of the signal power output. Providing an average SNR estimate may include estimating the SNR maximum likelihood output using the level-restored received signal output and the stored running weighted average; determining a received likelihood detector output using the level-restored received signal output and the SNR maximum likelihood output; and determining a new running weighted average using the received likelihood detector output, the SNR maximum likelihood output, and a plurality of weighting values, each value being approximately equal to an incremental probability of the occurrence of the current scaled received value with the current maximum likelihood SNR, raised to an empirically-derived power.

The method and apparatus described herein provide a new paradigm for the restoration of chaotic signals corrupted by random noise. Using a direct SNR estimator which requires only the transmit PDF, and an amplitude correction factor generator which makes use of a preselected receiver design operational power level, the amount of loss/gain in the received signal can be calculated and corrected to optimal receiver design levels. Whereas a prior art chaotic receiver typically loses synchronization whenever chaotic signal levels vary by more than +/−3 dB, optimal level restoration using the method and apparatus of the present invention has been demonstrated with 200 dB loss (equivalent to a signal transmission distance of 164,000 miles at 900 MHz), through 200 dB gain, preserving synchronization and receiver operation across the entire dynamic range. The full operational dynamic range depends on the resolution and numerical range of the target processor. Accuracy depends on noise content, of course. However, laboratory testing confirms that variations between the corrected signals and the original signals are limited to about ±0.2 dB (±5%) rms at or above 20 dB SNR, ±0.3 dB (±7%) at 10 dB SNR, and −1 dB (−26%) at 0 dB SNR with the chosen averaging window lengths of 1024 values for both the received power estimator running average and the Average SNR Estimator running weighted average used to generate the results shown herein. Other values of accuracy and range of SNR coverage will be observed for different choices of averaging window lengths. The algorithm is additionally dependent on the set of exponential argument values to which the incremental probability is raised; where the appropriate set of values correspond to the current estimate of received SNR on a one-to-one basis, and generally depend on the transmit PDF and the noise level.

The present invention solves the transmission loss intolerance problem of chaotic systems that has prevented their transition out of the laboratory. Robust reception for any digital chaotic receiver design, using arbitrary chaotic systems, is provided. The invention also paves the way for future research and development of sub-unity SNR chaotic receiver capability.

BRIEF DESCRIPTION OF THE DRAWINGS

These and other features, aspects and advantages of the present invention will become better understood with regard to the following description, appended claims and accompanying drawings wherein:

DETAILED DESCRIPTION OF THE PREFERRED EMBODIMENT

The signal restoration apparatus and method of the present invention operate to isolate the message signal power from the noise power in a received signal, estimate the received message signal power deviations from receiver design values, generate a correction factor, and scale the received signal to the proper level for optimal receiver operation. Accurate adjustment for attenuation and amplification via the scaling factor is provided, restoring to optimal levels signals whose amplitude deviations are due to transmitter amplification (requiring attenuation for strong signal conditions) as well as propagation losses (requiring amplification for weak signal conditions). The technique is very general, and can be used by receivers of linear, nonlinear, or nonlinear chaotic design. Since the demonstrated embodiment requires only a transmit signal PDF and the optimum receiver signal level for desired operation as a priori knowledge to accomplish signal amplitude restoration, it is independent of carrier wavelength, modulating waveform, and modulation technique. The estimate of signal-to-noise ratio, where the signal power and noise power have historically been calculated separately, is useful in many communications applications for estimating message recovery fidelity, circular error probability for Global Positioning Satellite (GPS) systems, MAP detection enhancement, and receiver-feedback transmit power level control.

The apparatus and method of the present invention benefits applications which use linear design, nonlinear design, or nonlinear chaotic design. Combined with the invention, existing data recovery methods, such as automatic gain control and phase-locked loops, can operate more efficiently than is currently possible. In addition, application to chaotic communication systems overcomes the amplitude sensitivity of chaotic processes, permitting heretofore-impossible synchronization and message recovery in the presence of transmitter amplification and/or propagation path losses.

Figure 1:
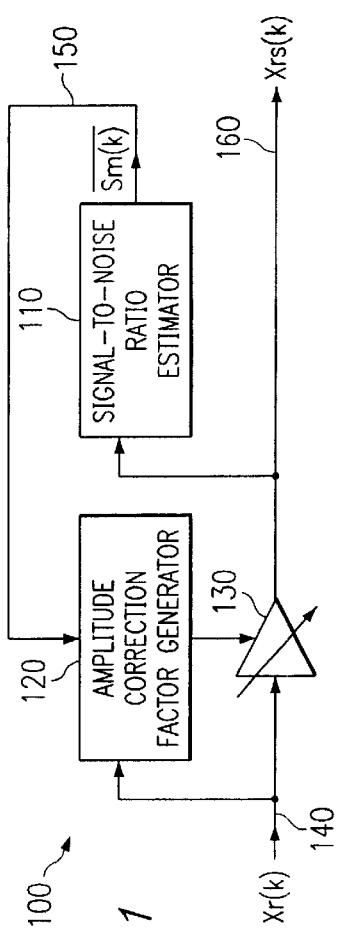
FIG. 1 is a block diagram of the apparatus for signal amplitude restoration.

The essence of the signal amplitude restoration apparatus 100 resides in two main elements, as shown in FIG. 1. The first is a Signal-to-Noise Ratio (SNR) Estimator 110, and the second is an Amplitude Correction Factor Generator 120. They are connected in closed-loop operation, and control a variable gain amplifier 130 that scales the received signal 140 to the appropriate power level to produce a scaled received signal output 160.

The $k^{th}$ received signal value $X_r(k)$ 140, which may be a chaotic signal corrupted by additive white Gaussian noise (AWGN), is one input to the Amplitude Correction Factor Generator 120. The variable k represents the number of signal iterates received, and essentially tracks time. The gain of the variable gain amplifier 130 is controlled by the output of the Amplitude Correction Factor Generator 120. The input to the variable gain amplifier 130 is the $k^{th}$ received signal value, $X_r(k)$ 140, and the output is the level-restored signal $X_{rs}(k)$ 160, which in turn serves as an input to the SNR Estimator 110. The output $\hat{p}_r(x, s_{nr})$ 150 of the SNR estimator 110 is fed back as a second input to the Amplitude Correction Factor Generator 120 (during the next iteration, i.e., k=k+1). The circuit reaches steady-state operation and provides the level-restored signal $X_{rs}(k)$ 160 for subsequent processing.

Figure 2:
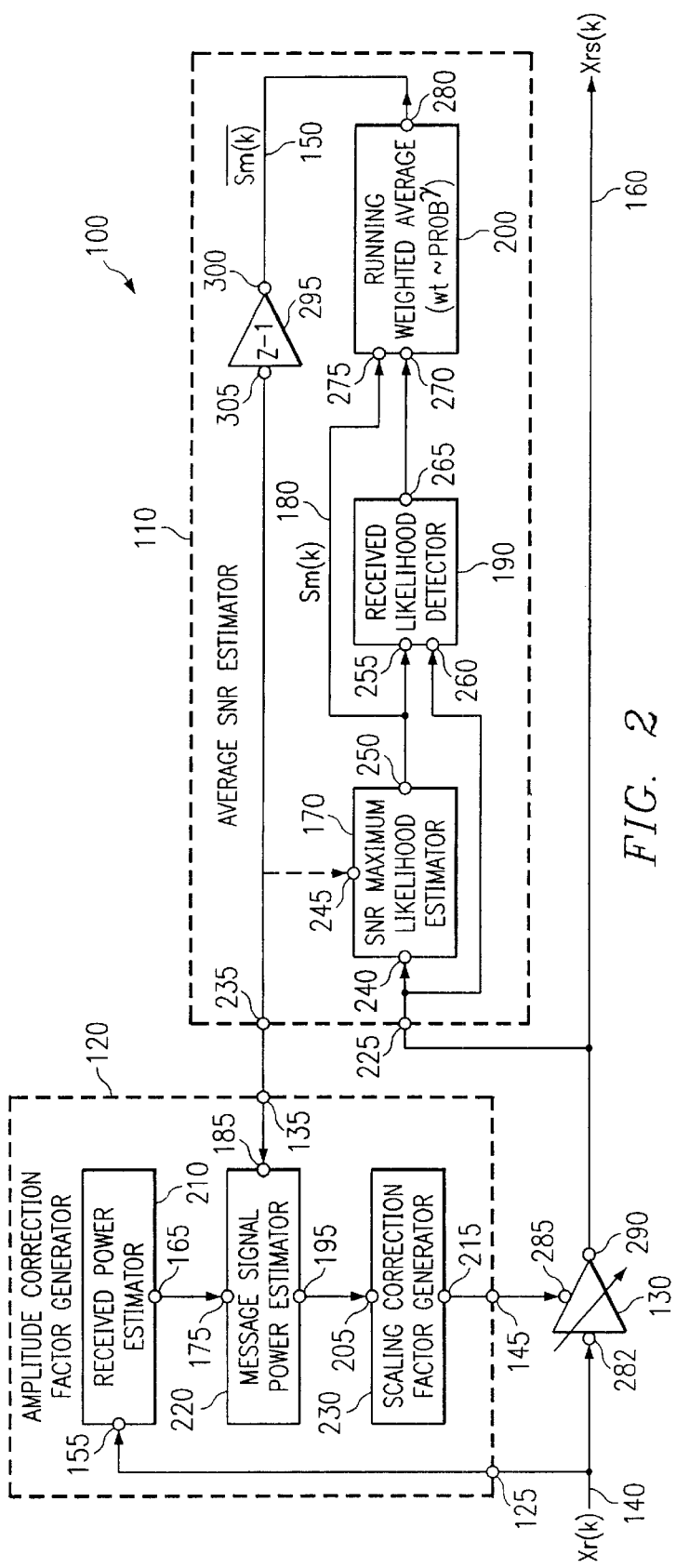
FIG. 2 is an expanded block diagram of the apparatus for signal amplitude restoration.

Turning now to FIG. 2, an expanded view of the signal amplitude restoration apparatus 100 can be seen. The apparatus 100 has a received signal input 140 and a scaled received signal output (or level-restored signal output) 160, and comprises the amplitude correction factor generator 120, which in turn includes a received signal input 125, an estimated signal-to-noise power ratio input 135, and a correction factor output 145. The apparatus 100 also includes a variable gain amplifier 130, which has an amplifier input 282 operatively coupled to the received signal input 140, a gain adjustment input 285 operatively coupled to the correction factor output 145, and a scaled amplifier output 290 operatively coupled to the scaled received signal output 160. Finally, the apparatus 100 includes the average SNR estimator 110 having a scaled input 225 operatively connected to the scaled amplifier output 290 and the scaled received signal output 160, and an estimated output 235 operatively connected to the estimated signal-to-noise power ratio input 135.

Turning now to FIG. 2, the construction and operation of the Amplitude Correction Factor Generator 120 can be seen. The amplitude correction factor generator 120 has a received signal input 125, an estimated signal-to-noise power ratio input 135, and a correction factor output 145. The generator 120 includes a received power estimator 210 having a power estimator input 155 operatively connected to the received signal input 125, and an estimated signal plus noise power output 165. The generator 120 also includes a message signal power estimator 220 having a signal plus noise power input 175 operatively connected to the estimated signal plus noise power output 165, a message signal power input 185 operatively connected to the estimated signal-to-noise power ratio input 135, and an estimated signal power output 195. Finally, the generator includes a scaling correction factor generator 230 having an estimated signal power input 205 operatively connected to the estimated signal power output 195 and a scaling factor output 215 operatively connected to the correction factor output 145.

As will be described in detail below, the estimated signal plus noise power output 165 is about equal to a summation of the received signal 125 squared over a preselected time interval window; the estimated signal power output 195 is about equal to the product of the estimated signal plus noise power output 165 and the estimated signal-to-noise power ratio input 135, divided by a quantity of one plus the estimated signal-to-noise power ratio input 135; and the scaling factor output 215 is approximately inversely proportional to the square-root of the estimated signal power output 195. Ideally, the scaling factor output 215 is about equal to the square root of a preselected receiver design power level divided by the square-root of the estimated signal power output 195.

The $k^{th}$ received value is input to the Received Power Estimator 210, which computes a running power estimate in a sliding time interval window. It performs the mathematical function:

$$(\tilde{S}+\tilde{N}) = \frac{1}{L}\sum_{k=1}^{L}[Xr(k)]^2$$

where $X_r(k)$ is the $k^{th}$ received value and L is the length of the sliding window. This equation is based on the statistical argument that the power variance of zero-mean statistically independent variables add, so that the power in the received signal is equal to the power of the transmitted signal plus the power of the noise corruption.

The Message Signal Power Estimator 220 receives the estimated signal plus noise power, $(\tilde{S}+\tilde{N})$, along with the estimated SNR ratio in the feedback path, $\hat{S}/\hat{N}$. Assuming that both the SNR estimate and the signal-plus-noise estimate are accurate and mutually consistent (i.e., that $\tilde{S} \cong \hat{S}$ and $\tilde{N} \cong \hat{N}$), the Message Signal Power Estimator 220 isolates the signal and returns the estimated signal power as:

$$\hat{S} = \frac{(\tilde{S}+\tilde{N})\left(\frac{\hat{S}}{\hat{N}}\right)}{1+\left(\frac{\hat{S}}{\hat{N}}\right)}.$$

The Scaling Correction Factor Generator 230 receives the message signal power estimate from the Message Signal Power Estimator 220. The Generator 230 has a priori knowledge of the receiver design operations power level $S_d$. If the deviation power ratio is calculated as:

$$D = \tilde{S}/S_d,$$

then the voltage correction factor can be defined as:

$$f = \sqrt{\frac{1}{D}} = \sqrt{\frac{S_d}{\tilde{S}}}.$$

The correction factor f is output from the Amplitude Correction Factor Generator 120 to the variable gain amplifier 130, which closes the loop and scales the $k^{th}$ received signal value $X_r(k)$ 140 by the $k^{th}$ correction factor value, $f_k$.

The estimation of SNR rather than noise power is a key element in the effective operation of the apparatus and method of the invention. To a first order approximation, the calculation of message signal power cancels the effect of inaccuracy in the SNR estimation process. The same estimate error is introduced via the SNR term in both the numerator and denominator.

Assume that the SNR calculation result contains the true SNR plus an error term:

$$\frac{\hat{S}}{\hat{N}} = \frac{S}{N}(1+m),$$

where m is the fractional error in the SNR estimate.

Substituting the SNR equation into the signal power equation results in a new equation for the signal estimate, thus:

$$\tilde{S} = \left[(\tilde{S}+\tilde{N})\left(\frac{S}{N}(1+m)\right)\right] / \left[1+\left(\frac{S}{N}(1+m)\right)\right].$$

For the case in which the SNR term in the denominator is dominant, (i.e., for SNR values >10 dB, such that S/N>>1), and canceling the equivalent error terms in the numerator and denominator, the equation for the signal estimate becomes:

$$\tilde{S} \cong (\tilde{S}+\tilde{N})\left(\frac{S}{N}\right) / \left(\frac{S}{N}\right),$$

which highlights the important result that the signal estimate found by this calculation method is largely devoid of SNR estimation error, depending primarily on the estimate of signal-plus-noise $(\tilde{S}+\tilde{N})$ for its accuracy at large SNR values.

FIG. 2 also illustrates the detailed construction and operation of the apparatus of the present invention, using a specific implementation that includes a statistically-based SNR estimator called the Average SNR Estimator 110, which is used to directly estimate the SNR contained in a signal contaminated by random noise. The SNR estimator 110 comprises an SNR maximum likelihood estimator 170, a received likelihood detector 190, and a running weighted averager 200.

The received likelihood detector 190 calculates the probability that the current received value was caused by the current SNR maximum likelihood estimate. It assumes that the current maximum likelihood SNR estimate did in fact cause the current received value to occur. This assumption may or may not be true, but is the optimal (statistically most probable) estimate of the situation. The received likelihood detector 190 calculates the relative probability of the current received value having been caused by the current maximum likelihood SNR estimate, rather than having been caused by any other possible SNR that could have resulted in the observation of the current received value.

For a given amount of noise in a channel, certain received values will occur more frequently than others. For example, the received PDF will equal the transmit PDF in the absence of noise, while a noise power larger than the signal power causes the received PDF to more closely resemble the noise PDF. Consequently, a given received value will happen with a different frequency for one amount of noise than would occur for a different amount of noise. These two observations enable the use of a weighted averaging technique to transform the sequence of instantaneous SNR estimates, which can vary substantially from iterate to iterate, into an average SNR value accurately reflecting the relative signal and noise power levels at the receiver input. Of course, any change in the transmit PDF will alter the distribution of received values and their corresponding maximum likelihood SNR estimates, resulting in the need for a modification to the weighted averaging process parameters in order to accurately reflect the SNR at the receiver input.

The average SNR estimator 110 has a scaled input 225 and an estimated signal-to-noise power ratio output 235, and comprises a SNR maximum likelihood estimator 170 having a scaled estimator input 240 operatively coupled to the scaled input 225, an (optional) averaged estimator input 245, and a maximum likelihood estimated output 250. The estimator 110 also includes a received likelihood detector 190 having a scaled detector input 260 operatively coupled to the scaled estimator input 240 and the scaled input 225, a likelihood detector input 255 operatively coupled to the maximum likelihood estimated output 250, and a received likelihood detector output 265. The estimator also includes a running weighted averager 200 that has a detected averager input 270 operatively coupled to the received likelihood detector output 265, an estimated averager input 275 operatively coupled to the maximum likelihood estimated output 250 and the likelihood detector input 255, and an estimated averager output 280. Finally, the estimator includes a unit delay element 295 with a unit delay input 300 operatively coupled to the estimated averager output 280 and a unit delay output 305 operatively coupled (as an option) to the averaged estimator input 245 and the estimated signal-to-noise power ratio output 235. The averaged estimator input 280 is provided but may not be used for two reasons. First, in the case of exclusively unimodal functions of incremental probability vs. SNR, it provides no algorithmic advantage; and second, it is possible to construct an algorithm that accurately estimates the received SNR using only global maxima, ignoring the local maximum close to the current estimate in multimodal cases. Thus, it provides an algorithmic advantage, but is not strictly necessary.

As will be described in detail below, the maximum likelihood estimated output 250 is about equal to a preselected maximum Probability Distribution Function (PDF) lookup table value associated with the scaled input 225 and (optionally) the estimated output 280. The maximum likelihood estimated output 250 may also be about equal to a maximum Probability Distribution Function (PDF) calculated value associated with the scaled input 240 and the estimated output 280. The maximum PDF may be about equal to a convolution of a transmit PDF model and a channel noise PDF model, wherein the transmit PDF model includes a windowed DC level component and a first plurality of functions (e.g. Gaussian functions) and wherein the channel noise PDF model includes a second plurality of functions (e.g. Gaussian functions).

The received likelihood detector output 265 will also be shown to be about equal to an incremental probability (PDF bin value) of the maximum likelihood estimated output 250 and the scaled input 225 from a received Probability Distribution Function associated with the maximum likelihood estimated output 250. The estimated averager output 280 will be shown to be about equal to a running weighted average of the maximum likelihood estimated output 250, which makes use of a plurality of weight values, wherein each one of the plurality of weight values is approximately equal to an incremental probability of the occurrence of the maximum likelihood estimated output 250 and the received likelihood detector output 265, raised to a preselected power. The unit delay output 305 of the unit delay element, or register 295, which is used for storage, is about equal to a previously stored estimated averager output $\overline{S_m}(k-1)$.

For the embodiment of the invention shown in FIG. 2, an instantaneous SNR value $S_m(k)$ 180 is determined for each received value $X_r(k)$ 140 by the SNR maximum likelihood estimator 170. Each combination of the current received value $X_r(k)$ 140 and the instantaneous SNR value $S_m(k)$ 180 is then statistically processed by the received likelihood detector 190 to find its likelihood of occurrence. The resulting instantaneous SNR values 180 are then processed in a running weighted averager 200 using a sliding time window, weighted, for example, according to the reciprocal of the likelihood of occurrence (received likelihood detector output) 265. The output, an estimate of the received SNR power ratio $\overline{S_m}(k)$ 150, is stored in the unit delay element 295 to provide an input value to the Amplitude Correction Factor Generator for use with the next signal iterate received (i.e., $X_r(k+1)$).

The SNR estimator 110 in the general case of FIG. 1 can use any method that provides an estimate of the received SNR power ratio as the output, denoted as:

$$\overline{S_m}(k) = \hat{S}/\hat{N}$$

where $\overline{S_m}(k)$ 150 is the $k^{th}$ average maximum likelihood signal-to-noise ratio estimate, $\hat{S}$ is the signal power estimate, $\hat{N}$ is the noise power estimate, and $\hat{S}/\hat{N}$ constitutes the SNR power ratio estimate.

Figure 3:
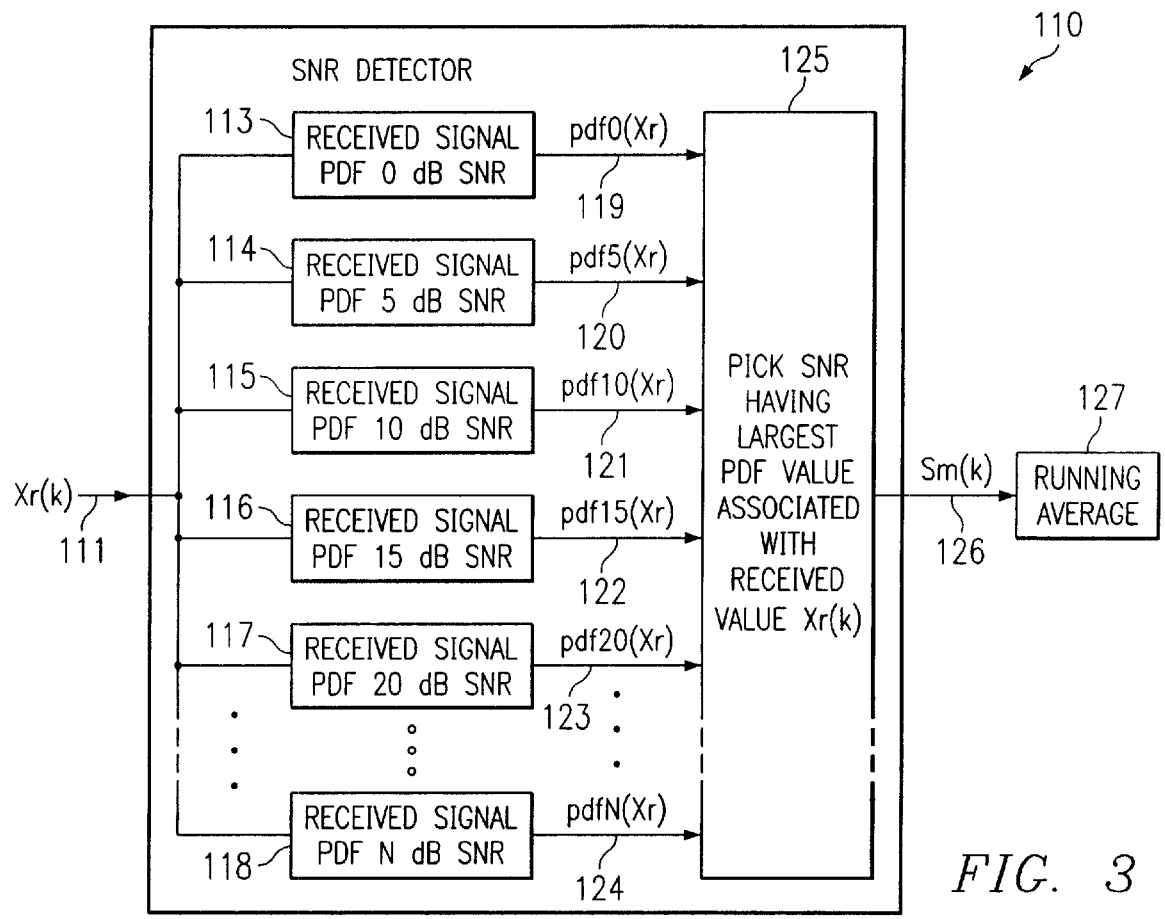
FIG. 3 is a block diagram of one embodiment of an SNR estimator based on a lookup table approach to SNR estimation.
Figure 4A:
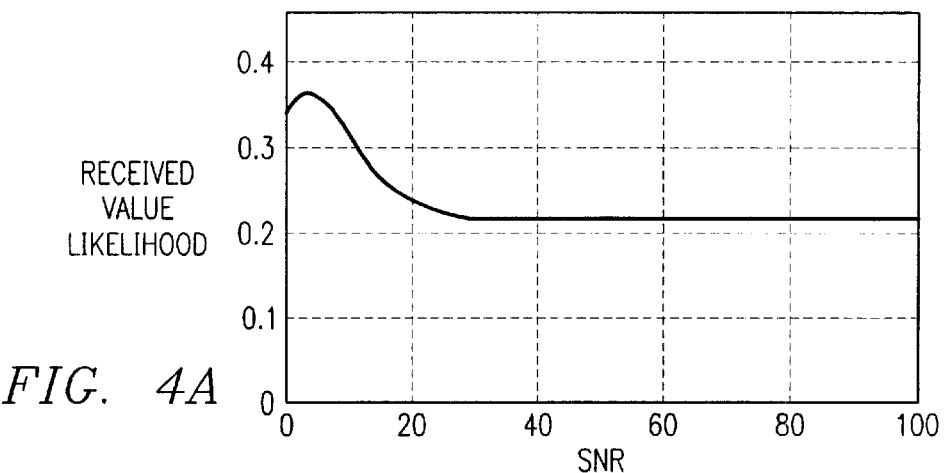
FIGS. 4A–4D are graphs illustrating PDF plots along the SNR axis for a fixed quantized, received value.
Figure 4B:
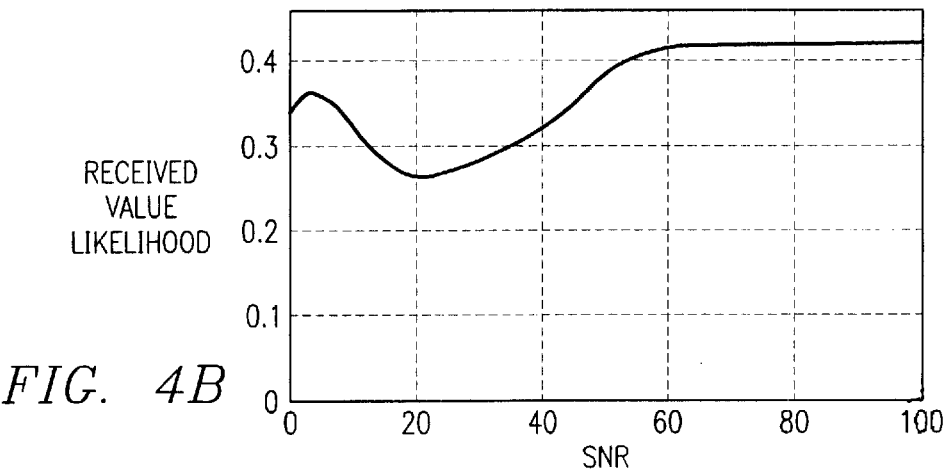
Figure 4C:
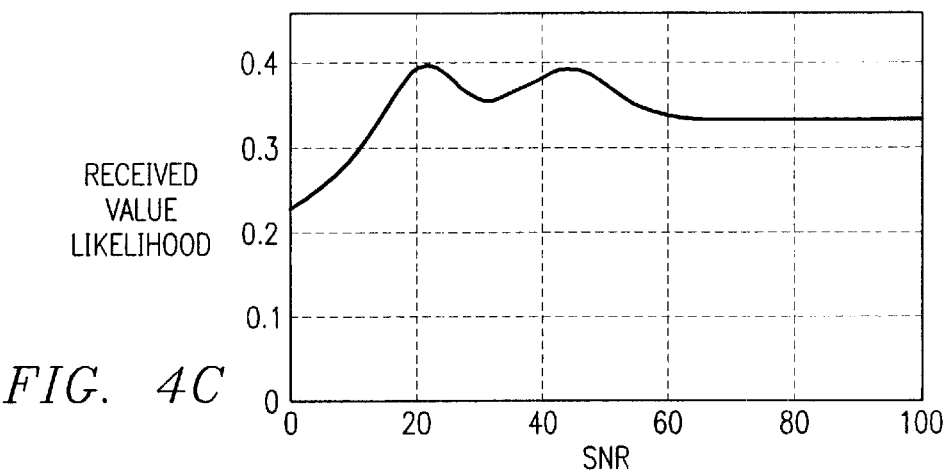
Figure 4D:
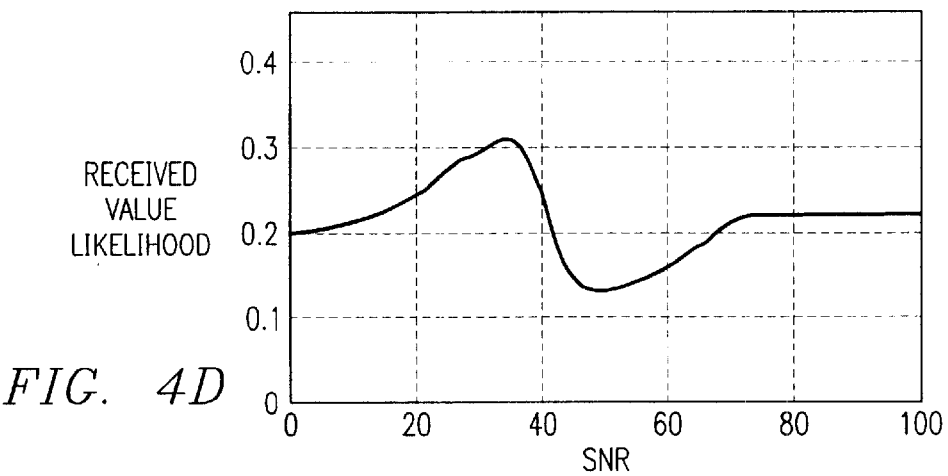

The SNR estimator 110 may operate based on a lookup table approach, or via calculations using closed form equations. FIG. 3 illustrates the use of a lookup table. To use a lookup table for finding the maximum likelihood SNR for a received iterate, the instantaneous SNR for a given received value can be defined as the SNR value for which a received PDF trace has the greatest probability of occurrence out of the PDF traces for all SNR values at the received value. Before a received signal iterate Xr(k) 111 is fed into an SNR detector 110, received signal PDFs for various SNR values (e.g., using a granularity of 5 dB for SNR values from N=0 dB to N=20 dB, pdfNdB(Xr)) are stored in memory in a lookup table 113–118. The received value Xr(k) 111 is passed into the lookup table 113–118 and the SNR Sm(k) 119–124 corresponding to the greatest PDF value is returned from the detector 110. The resulting SNR decision Sm(k) 126 for each received iterate Xr(k) 111 is combined with others and smoothed using a running averager 127. Such a lookup table approach can be used for any empirically generated received PDF traces and/or transmit PDFs. Empirical received PDF traces are the most general because they are exact regardless of the transmit PDF and noise PDF for a given point in time, but are difficult to obtain because of the large number of iterates required. For this reason, they do not lend themselves well to changing channel conditions, where a different SNR granularity may be desired. Empirical transmit PDF traces perform well, as do models of empirical transmit PDF traces. The received PDF is the convolution of the transmit PDF with the noise PDF, which can be calculated at receiver initialization for a given noise model and predefined set of noise power values or SNR granularity.

An embodiment that yields significant savings in memory requirements and processing overhead for Digital Signal Processing (DSP) applications involves the pre-determination of maximum likelihood (ML) signal-to-noise ratio (SNR) for a given received value, and storage of this abbreviated data in a lookup table. The average SNR maximum likelihood estimator 170 function and the received likelihood detector 190 function in FIG. 2 are performed a priori as a receiver design exercise. Each possible observed value falls into a bin in the quantized received probability density function (PDF) argument range. Each quantized PDF bin has a value or a small set of values representing the possible maximum likelihood SNR(s) for the corresponding range of observed values that fall into the bin. This is a very abbreviated set of numbers relative to the full two-dimensional PDF database required for a comprehensive lookup table as shown in FIG. 3. In addition, the lookup operation is significantly less computationally expensive than the Gaussian approximation approach used in the modified Newton-Raphson iterative root approximation optimization technique described herein.

FIGS. 4A–4D show slices through the PDF plots along the SNR axis for a fixed quantized, received value, with each plot representing probability versus SNR for values of x. The maxima of each trace represent the largest PDF bin value, read on the y-axis, for the received data point across all possible SNR values within the x-axis. The largest PDF value and corresponding SNR is the maximum likelihood SNR estimate for the given received value. The configurations of FIG. 2 and FIG. 3 return this result. However, modified Newton-Raphson algorithm processes and equations incur significant computational complexity, and the embodiment of FIG. 3 necessitates the storage of a matrix of values representing all bins in the PDFs for all SNRs in the expected range and chosen granularity of the receiver design. Both methods are very general in their applicability.

The abbreviated lookup table embodiment only requires storing those ML SNR numbers produced by either of these generic methods. For example, using the traces shown in FIGS. 4A–4D, the abbreviated lookup table database would contain:

for received value=0 (upper left trace) ~3 dB (one peak);
for received value=0.1091 (upper right trace) ~3 dB and 100 dB (one peak, one extended plateau);
for received value=1.1400 (lower left trace) ~22 dB and ~44 dB (two peaks); and
for received value=0 (upper left trace) ~35 dB and ~100 dB (one peak, one extended plateau).

The resulting table is significantly smaller than that required for full PDF value storage, occupying only a fraction of the memory required for the generic case shown in FIG. 3. The corresponding lookup operation is extremely fast, enabling efficient digital signal processing implementation and the concomitant high data rates required of communications systems.

In addition, there are a relatively small number of possible combinations of (received value, ML SNR) data pairs because each received value has one, or a small number of, possible maximum likelihood SNR value(s) that correspond to the current average SNR situation. For example, in FIG. 4C, corresponding to a quantized received value of 1.1400, the appropriate ML SNR is 22 dB if the current average SNR is below 30 dB. However, if the current average SNR is above 30 dB, the ML SNR value of 44 dB should be used. The ability to make this distinction is, of course, provided by the averaged estimator input 245 to the SNR maximum likelihood estimator 170.

Each of the possible combinations of (received value, ML SNR) data pairs will have a corresponding probability of occurrence. This probability is the received likelihood detector output 265 of the received likelihood detector 190, and the detected averager input 270 to the running weighted averager 200. So rather than storing a set of entire PDF traces (empirical or modeled) to determine this probability, or calculating it from a set of model equations, the relatively small set of specific values can be stored in a lookup table as was done for the ML SNR values. The resulting probability table will be the same size as the ML SNR table, with similar savings in memory and/or computational burden. This yields a DSP implementation that is efficient in both memory and processing power and time, further aiding the communications data rate.

Alternatively, if the system lends itself to description by closed-form equations, the received PDF can be calculated directly from the transmit PDF and noise PDF models. These can then be stored in the lookup table for any desired granularity and changed at will.

In spite of its generality, the lookup table approach has some limitations. The approach described returns the most probable global SNR value when a local solution may be more appropriate. The lookup table approach is also memory intensive, but remains a feasible choice for systems without a closed-form equation representation that enable continuous SNR estimation capability.

Figure 5:
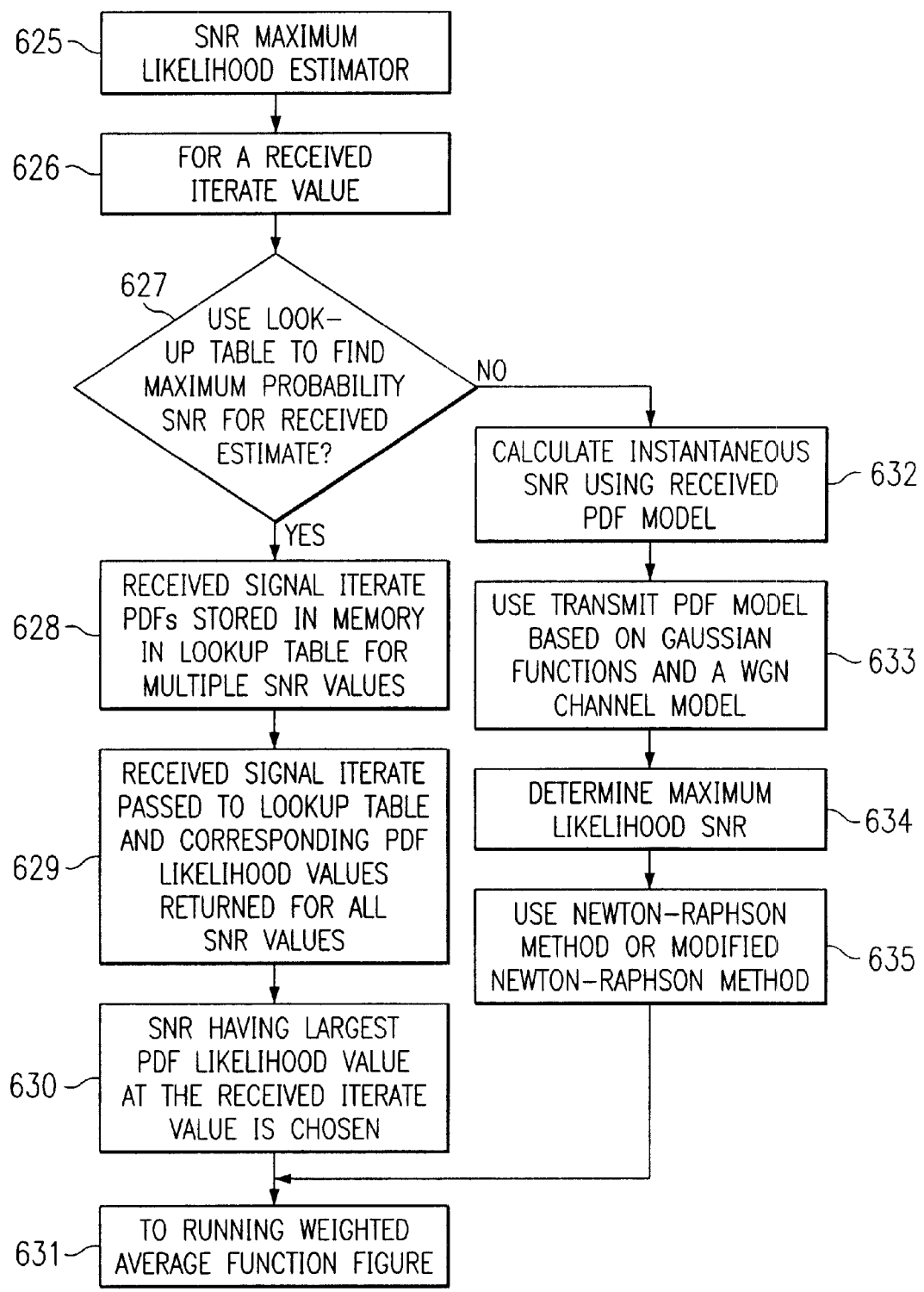
FIG. 5 is a flowchart illustrating operation within the SNR maximum likelihood estimator.

Turning now to FIG. 5, a flowchart is shown of the SNR maximum likelihood estimator 625 (170 in FIG. 2) operations. The received signal comprises a data sequence of N iterates, wherein the first iterate represents a first value in the data sequence and the Nth iterate represents a last value in the data sequence. For a received signal iterate value in step 626, a lookup table can be used to find the maximum probability SNR for a received iterate in step 627. The lookup table contains received signal PDFs that have been stored in memory in step 628. The received signal iterate value is passed into the lookup table and the corresponding PDF value is returned in step 629 for all SNR values. The SNR having the largest PDF value associated with the received value is chosen in step 630. The individual iterate decisions are then smoothed through a running average calculation in step 631.

Alternatively, as shown in step 632, the instantaneous SNR may be calculated rather than using a lookup table. An algorithm is used based on the closed-form equations realized for the received PDF. The model chosen for the transmit PDF is based on Gaussian functions and an AWGN channel model in step 633. The received PDF is determined by convolving the transmit PDF with the channel noise PDF in step 634, producing another set of Gaussian functions (since the convolution of a Gaussian function with another Gaussian function is a Gaussian function).

The transmit PDF model was chosen to be a windowed DC level plus a summation of infinite-domain Gaussian functions to provide a simplified expression of terms, having only two Q-functions for the windowed DC term, with the transmit PDF Gaussian terms remaining Gaussian in the received PDF. The calculation of Q-functions is computationally more expensive than the evaluation of Gaussian functions, even when a Q-function approximation formula is used.

The equation for the transmit PDF approximation model in step 633 is:

$$\tilde{p}_t(x) = cW_{dc}(x) + \sum_{l=1}^{L} \frac{b_l}{\sqrt{2\pi}\sigma_l} e^{-((x-m_l)/\sqrt{2}\sigma_l)^2}$$

with $W_{dc}(x) = U(x-(-H_{max})) - U(x-H_{max}) = U(x-(-1.2854)) - U(x-1.2854)$, where $U(x-x_0)=0$ for $x<x_0$ and $U(x-x_0)=1$ for $x \geq x_0$ (U is the unit step function), and where $H_{max}=1.2854$ is an example of the maximum chaotic signal transmission magnitude for the specified bin structure using the Henon chaotic process.

The received data PDF is the convolution of the transmit PDF and the PDF of the AWGN in the channel. In the general case of a received PDF without closed form representation, the FFT-based fast convolution technique can be used to find the received PDF for any SNR value and any combination of transmit and noise PDF waveforms, as is well known in the art. It is therefore important to define the bin range to include a sufficient region of insignificant values so as to minimize aliasing contamination of the desired linear convolution result caused by the inherent circular convolutional characteristic of the FFT-based method. In addition, the greatest computational efficiency of the FFT is realized when the input data length is set to be a power of 2. Zero-padding can also be used to minimize concerns regarding circular convolution. However, FFT calculations tend to load down computer system resources if 4096 bins, for example, are spread over such a small range of received values that zero padding is required. The tradeoff is that calculation fidelity decreases if fewer bins are used over the range of significant values.

For example, a bin value range of [−5.12, 5.12] may be selected based on the expected transmit PDF, anticipated worst case SNR of 0 dB, and the need for a sufficient number of bins to minimize linear convolution contamination from the inherently circular convolutional process of FFT-based fast convolution. The number of bins can be set to 4096, as a tradeoff between fidelity, computational resources, and speed. The bin range [−5.12, 5.12] and 4096 bins yields a bin width of about 1/400, or 0.0025, and a bin density of 400$_{bins/Unit\ Range}$. To empirically find the many PDFs in this investigation, a MATLAB software histogram function can be used for each PDF calculation to get the number of occurrences in the time series that fall into the range of numbers for each data bin. In this example, and using the MATLAB software, consider allowing b=bin index, B=number of data bins, K=number of iterates in the time series, $_b$n=number of hits in data bin b, $_b$r=relative number of occurrences in data bin b, w=bin width, which is constant for all bins, p=continuous probability density function, $_b$P=the PDF value of data bin b (quantized probability density function), and P=probability. Then $_b$r=$_b$n/K, and $$\sum_{b=1}^{B} {_bn} = K,$$

such that $_b$n is found easily by using the MATLAB software histogram function.

The fundamental and well-known definition of PDF requires that:

$$P_\infty = \int_{-\infty}^{\infty} (p(x))dx = 1.$$

Thus, for the present formulation, this translates into the requirement that:

$$\sum_{b=1}^{B} {_bpw} = 1.$$

The PDF can thus be found from the relative number of occurrences as follows:

$$\sum_{b=1}^{B} {_br} = \sum_{b=1}^{B} {_bn}/K = K/K = 1,$$

$$\sum_{b=1}^{B} {_bpw} = w\sum_{b=1}^{B} {_bp} = \sum_{b=1}^{B} {_br}, \quad \text{and}$$

The channel noise PDF can be modeled as:

$$p_n(x) = \frac{1}{\sqrt{2\pi}\,\sigma_n} e^{-\left(\frac{x}{\sqrt{2}\,\sigma_n}\right)^2}.$$

The received PDF model in step 633 is found by the convolution of the transmit PDF model with the noise PDF model, where $\tilde{p}_r(x)=\tilde{p}_t(x)*p_n(x)$, with "*" representing the convolution operator. In integral form:

$$\tilde{p}_r(x) = \int_{-\infty}^{\infty} \tilde{p}_t(y)p_n(x-y)\,dy.$$

Thus:

$$\tilde{p}_r(x,\sigma_n) = \int_{-\infty}^{\infty} \left\{ \left( cW_{dc}(y) + \sum_{l=1}^{L} \frac{b_l}{\sqrt{2\pi}\,\sigma_l} e^{-\left(\frac{y-m_l}{\sqrt{2}\,\sigma_l}\right)^2} \right) \left( \frac{1}{\sqrt{2\pi}\,\sigma_n} e^{-\left(\frac{x-y}{\sqrt{2}\,\sigma_n}\right)^2} \right) \right\} dy,$$

where $\sigma_n^2=S/S_{nr}$=noise variance=noise power, s=signal power, $s_{nr}$=signal-to-noise ratio (SNR), and $\tilde{p}_r(x,\sigma_n)=\tilde{p}_r(x,s_{nr})$=a function of both the received value and the noise power.

Carrying the SNR variable explicitly because it is the quantity of interest yields:

$$\tilde{p}_r(x,s_{nr})=\alpha(x,s_{nr})+\beta(x,s_{nr}),$$

where:

$$\alpha(x,s_{nr}) = \int_{-\infty}^{\infty} \left\{ (cW_{dc}(y)) \left( \frac{1}{\sqrt{2\pi}\,\sigma_n} e^{-\left(\frac{x-y}{\sqrt{2}\,\sigma_n}\right)^2} \right) \right\} dy, \quad \text{and}$$

$$\beta(x,s_{nr}) = \int_{-\infty}^{\infty} \left\{ \left( \sum_{l=1}^{L} \frac{b_l}{\sqrt{2\pi}\,\sigma_l} e^{-\left(\frac{y-m_l}{\sqrt{2}\,\sigma_l}\right)^2} \right) \left( \frac{1}{\sqrt{2\pi}\,\sigma_n} e^{-\left(\frac{x-y}{\sqrt{2}\,\sigma_n}\right)^2} \right) \right\} dy.$$

The first term is integrated with a standard change of variables as:

$$\alpha(x,s_{nr}) = c\left[ Q\left(\frac{-H_{\max}-x}{\sigma_n}\right) - Q\left(\frac{H\max-x}{\sigma_n}\right) \right], \quad \text{where}$$

$$\sigma_n^2 = s/s_{nr} \quad \text{and} \quad Q(\gamma) = \frac{1}{\sqrt{2\pi}} \int_{\gamma}^{\infty} e^{-\frac{1}{2}\gamma^2} d\gamma.$$

An approximation to the Q-function has been determined to reduce computation time by a factor of 2 and is accurate to within 1.5% across the entire range of x. The approximation is:

$$Q(x) \cong \left[ \frac{1}{\left(1-\frac{1}{\pi}\right)x + \frac{1}{\pi}\sqrt{x^2+2\pi}} \right] \frac{1}{\sqrt{2\pi}} e^{-x^2/2}.$$

The approximation has 1–1.5% accuracy for arguments in the range of [0.3–1.2]. Values outside the range yield more accurate approximations, asymptotically approaching zero error in both directions. For the windowed DC implementation illustrated herein, the Q-function is used only in the first term of equation for $\tilde{p}_r(x,s_{nr})$, where the positive argument shown for $a(x,s_{nr})$ results in 1.5% error for the range $$0.3 < \frac{H_{max} - x}{\sigma_n} < 1.2 \text{ and } H_{max} - 1.2\sigma_n < x < H_{max} - 0.3\sigma_n.$$

Since $Q(-x)=1-Q(x)$, the greatest inaccuracy is also in the range $1.2\sigma_n - H_{max} > x > 0.3\sigma_n - H_{max}$.

The inaccuracy occurs in like manner for the other edge of the DC window. It is most pronounced just inside and outside the edges of DC window, and increases with larger channel noise power. The second term in the received PDF closed-form model equation, $\beta(x,s_{nr})$, is exact, and reduces the contribution of the Q-function error to the received PDF convolution result. Using a standard tabulation from a mathematical reference book:

$$\int_{-\infty}^{\infty} e^{(-p^2 x^2 \pm qx)} dx = e^{\frac{q^2}{4p^2}} \frac{\sqrt{\pi}}{p} \text{ for } p > 0,$$

and $\beta(x,s_{nr})$ can be solved as:

$$\beta(x, s_{nr}) = \sum_{l=1}^{L} \frac{b_l}{\sqrt{2\pi}\,\sigma_{nl}} e^{-\left(\frac{x-m_l}{\sqrt{2}\,\sigma_{nl}}\right)^2},$$

where $\sigma_{nl}^2 = \sigma_n^2 + \sigma_l^2$ and $\sigma_n^2 = s/s_{nr}$.

Turning back to FIG. 5 the next step is to determine the maximum likelihood SNR in step 634. The basics of this method draw on the observation that the received probability $\tilde{p}_r(x,s_{nr})$ is a function of two variables, x and $s_{nr}$. It is not a joint probability function because only the function of x is a PDF with a unity area (slices of constant $s_{nr}$), while the function of $s_{nr}$ has unbounded area (slices of constant x).

As noted previously, the convolution of Gaussian functions results in a Gaussian function whose power (variance) is equal to the sum of the constituent power variances, which is a well-known result in probability theory.

The running weighted averager 200 can operate using only knowledge of the transmit PDF, which is always available for any choice of chaotic system and modulation method used in the transmitter, as is well known in the art. Although general methods employing FFT-based fast convolution can be used to calculate the SNR estimate, one preferred embodiment utilizes a model of the transmitted signal PDF comprising a summation of weighted Gaussian functions (as described above, and see also A. Fleming-Dahl, "A Chaotic Communication System with a Receiver Estimation Engine," Dissertation, Georgia Institute of Technology, 1998, incorporated herein by reference in its entirety). Any PDF can be so modeled, and the resulting closed-form equations enabled the use of a modified Newton-Raphson iterative root approximation optimization technique to compute the instantaneous maximum likelihood SNR for any received iterate. The instantaneous SNR values are combined into an average SNR estimate via a running weighted average calculation, where the weights are inversely proportional to the probability of occurrence of the (current received value $X_r(k)$ 140, instantaneous SNR value $S_m(k)$ 180) data pair.

An alternative embodiment for implementing the function of the running weighted averager 200 varies the method of weighting the average. Rather than calculating weights for the averaging process from the inverse of the probability of occurrence of the (current received value $X_r(k)$ 140, instantaneous SNR value $S_m(k)$ 180) pair found from the appropriate received signal PDF, this probability can be raised to a power that may or may not be equal to negative one, with each choice of exponent corresponding to a "natural" SNR estimate that closely approximates a given actual channel SNR. This embodiment is especially effective at low SNR values.

The accuracy of the received signal power estimate, (S+N), depends on the length L of the sliding window as well as the nature of the signal (i.e., chaotic, random, linear, etc) used in the running average power calculation. Window lengths can be chosen according to the standard deviation of the power calculation accuracy for any type of signal, and sufficiently long windows will exhibit calculation error PDFs approximating Gaussian distributions. In choosing a window length, the tradeoff between power estimate accuracy and computational resources must be weighed along with other design performance criteria to develop a system with the desired characteristics, as is well known in the art.

Chaos-shift keying is one possible signal modulation method which may be used to demonstrate the effectiveness of the apparatus and method of the present invention. In this case, a logical zero data bit results in the transmission of a sequence from one chaotic process, and a logical one causes transmission from another chaotic process. The chaotic systems/processes used may be Henon and mirrored Henon maps, wherein the strange attractor of the Henon system is mirrored through the x- and y-axes to create the second chaotic (mirrored Henon) process. The data sequence is assumed to have equal probability of occurrence for the logical zero and logical one data states, and the mirrored strange attractors of the chaotic processes used result in a binary antipodal relationship between the corresponding time sequences. Since the iterate value for one system is always the negative of the iterate value for the other, with equal probability of occurrence, the resulting transmit sequence is expected to provide a mean value of zero. In addition, while the power for both systems is assumed to be identical, the transmitted power is greater than each system alone due to switching between systems.

Figure 6:
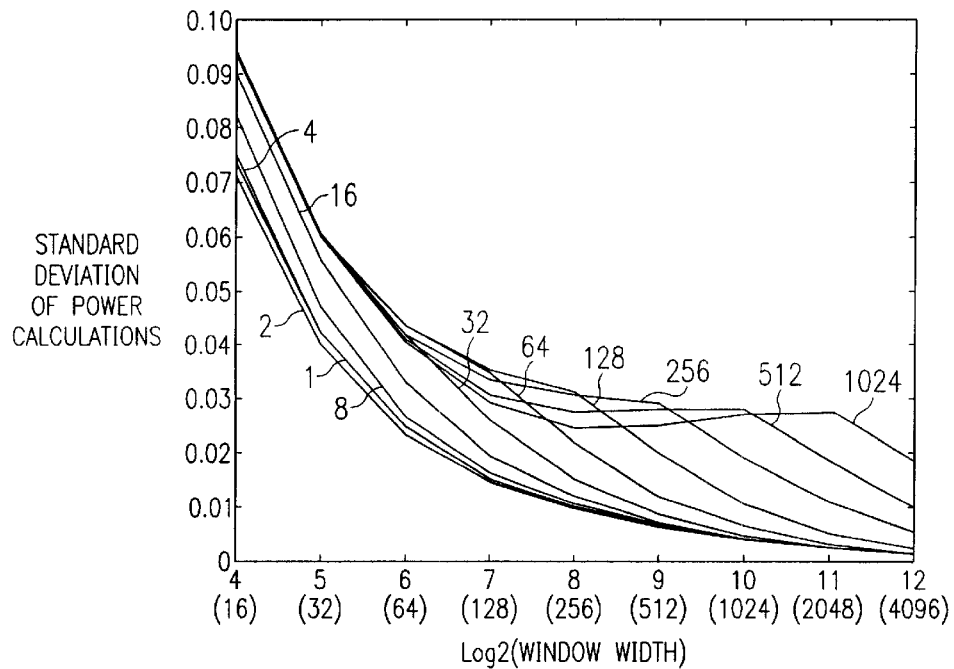
FIG. 6 is a graph of power calculation standard deviation as a function of window length (L) for data bit dwell times of 1, 2, 4, 8, 16, 32, 64, 128, 256, 512, and 1024 chaotic iterates per bit.

The windowed power calculation standard deviation is the principal control for the accuracy of the signal power level determination and restoration at large SNR values. FIG. 6 is a plot of the standard deviation of the windowed power calculations versus window length, considering dwell times of 1, 2, 4, . . . , 512, and 1024 chaotic iterates per bit. The graph can be used as a first gauge of window width to achieve a desired standard deviation, and should be followed by an evaluation of Gaussian distribution fit. The traces change from decreasing in a continuous, monotonic fashion at data bit dwell times of less than 64-iterates per bit, to having a knee, and then to eventually losing the monotonic quality entirely above 256-iterate dwell times. This reflects the fact that short windows for long data bit dwell times in a chaos-shift keyed modulation scheme yield power calculations that tend toward the power of the individual chaotic systems. Long windows are necessary to integrate over several data bits for accurate estimation of the transmitted signal power for long dwell times. The choice of window length for such dwell times must, therefore, be chosen beyond the knee in order to accurately estimate the power of the actual transmitted sequence, rather than that of the individual chaotic systems.

The next step 634 is to determine the maximum likelihood SNR. The basics of this method draw on the observation that the received probability $\tilde{p}_r(x,s_{nr})$ is a function of two variables, x and $s_{nr}$. It is not a joint probability function because only the function of x is a PDF with unity area (slices of constant $s_{nr}$), while the function of $s_{nr}$ has unbounded area (slices of constant x). Using an algorithmic method of solving for the maximum probability point to determine the corresponding SNR as the desired instantaneous value, the preferred method should be fast and respond only to maxima. In addition, the question of choosing local or global solutions arises in situations with more than one peak, as well as traces with two identical peaks that must be addressed.

The next step in the SNR maximum probability estimation is to use either the Newton-Raphson method or the modified Newton-Raphson method to determine the maximum probability SNR in step 635. The Newton-Raphson iterative root approximation optimization technique was targeted for the algorithm because it converges quadratically to a solution as it finds the zeros of a function. The Newton-Raphson method operates on functions expressed as $f(x_{sol})=0$, and requires the derivative of the function in its approximation correction process. The iterated equation is:

$$x_{j+1} = x_j - \frac{f(x_j)}{f'(x_j)},$$

where j=the iterate counter, $x_j$=the current approximation, $$f(x_j) = [f(x)]_{x=x_j}, \quad f'(x_j) = \left[\frac{df(x)}{dx}\right]_{x=x_j},$$

and $x_{j+1}$=the next approximation. At $x=x_{sol}$, $f(x_{sol})=0$ and $x_{j+1}=x_j=x_{sol}$, and the iteration is complete.

Convergence of this method is not guaranteed and generally depends on the initial estimate and the step size that is calculated from the function and its derivative on each iterate. This method will find any zero of the function that is close enough to its initial value and has a well-behaved sequence of correction calculations. Any solution point can be viewed from the standard nonlinear dynamical perspective as a fixed point of the interactive process. For a communication system based on chaos, correction steps that are large enough to move the next approximation out of the basin of attraction for a given solution will cause the iterative procedure to diverge from that point.

The Newton-Raphson method can be used to solve the derivative of another function, for example:

$$f(s_{nr}) = \frac{d[\tilde{p}_r(x, s_{nr})]}{ds_{nr}}.$$

The solutions $f(s_{nr_{sol}})=0$ in this case correspond to the maxima, minima, and points of inflection for the probability function of SNR for a given received value, where its first derivative is zero. Since the desired outcome of the Newton-Raphson method operating on the received PDF, $\tilde{p}(x, s_{nr})$, is the maximum likelihood SNR for a given received value, the fundamental method returns superfluous solutions. This result necessitates a post-processing test to differentiate between maxima solutions, minima solutions, and point-of-inflection solutions, with only the maxima being applicable to the problem at hand. If the solution tested is found to be other than a maximum, a new calculation must be performed in another attempt to find the desired maximum point. This solve/test/resolve process can be lengthy, repetitive, and inefficient. Thus, a technique that solves for only the maxima of the $\tilde{p}(x,s_{nr})$ function, thereby yielding the desired maximum likelihood SNR for a given received value out of a single calculation process, is highly desirable.

Alternatively, the modified Newton-Raphson technique may be used to determine the maximum probability SNR in step 635 by adapting the Newton-Raphson technique to this design via three modifications to control its functional characteristics. The first modification causes it to find only the maxima of the probability function of SNR based on the fact that the second derivative of a function identifies its concave down (maximum) or concave up (minimum) characteristic. The second change limits the maximum correction per step in order to avoid jumping over maxima without detecting them. And finally, the computed step size can be multiplied by a factor that toggles between two values to prevent the iterative process spanning a peak and causing detection failure. Other standard programming techniques such as limiting the number of iterations allowed in each execution, hard programming upper and lower $s_{nr}$ range limits, protecting against a zero denominator, and early loop termination via testing each new approximation for proximity to the current value may also be used.

The Newton-Raphson equation expressed as functions of the probability function of SNR is:

$$s_{nr_{j+1}} = s_{nr_j} - \frac{\left[\frac{d[\tilde{p}_r(x, s_{nr})]}{ds_{nr}}\right]_{s_{nr_j}}}{\left[\frac{d^2[\tilde{p}_r(x, s_{sr})]}{ds_{nr}^2}\right]_{s_{nr_j}}}.$$

The derivative in the numerator is determined below, and the fact that it equals zero at the solution allows a term to be dropped that simplifies the second derivative in the denominator. The correction term actually used is, therefore, is not exactly as specified here, and the notation will be changed to reflect this, as follows:

$$s_{nr_{j+1}} = s_{nr_j} - \frac{f(s_{nr_j})}{f'(s_{nr_j})},$$

where $f(s_{nr}) \propto \frac{d[\tilde{p}_r(x, s_{nr})]}{ds_{nr}}$ and $f'(s_{nr}) = \frac{df(s_{nr})}{ds_{nr}} \propto \frac{d^2[\tilde{p}_r(x, s_{nr})]}{ds_{nr}^2}$.

Differentiating $\tilde{p}_r(x,s_{nr})$ with respect to $s_{nr}$ gives:

$$\frac{d[\tilde{p}_r(x, s_{nr})]}{ds_{nr}} = \frac{d[a(x, s_{nr})]}{ds_{nr}} + \frac{d[\beta(x, s_{nr})]}{ds_{nr}},$$

and differentiating $a(x,s_{nr})$ with respect to $s_{nr}$ gives:

$$\frac{da(x, sn_r)}{ds_{nr}} = c\left[\frac{d}{d\sigma_n}\left\{Q\left(\frac{-H_{\max} - x}{\sigma_n}\right)\right\}\frac{d\sigma_n}{ds_{nr}} - \frac{d}{d\sigma_n}\left\{Q\left(\frac{H_{\max} - x}{\sigma_n}\right)\right\}\frac{d\sigma_n}{ds_{nr}}\right].$$

The differentiation of the Q-function was accomplished using the Liebniz rule:

$$\frac{d}{dy}\left[\int_{s(y)}^{r(y)} p_x(x)dx\right] = p_x(r(y))\frac{dr(y)}{dy} - p_x(s(y))\frac{ds(y)}{dy}.$$

The result was verified using the following equation:

$$\frac{d}{dx}\text{erf}(x) = \frac{2}{\sqrt{\pi}}e^{-x^2}$$

and the relationship:

$$Q(x) = \frac{1}{2}\left[1 - \text{erf}\left(\frac{x}{\sqrt{2}}\right)\right].$$

Combining the equations gives:

$$\frac{d}{dx}Q(x) = -\frac{1}{\sqrt{2\pi}}e^{-\frac{x^2}{2}},$$

such that $$\frac{d\alpha(x, s_{nr})}{ds_{nr}} =$$

$$\left(\frac{1}{\sqrt{2\pi}\,s_{nr}}\right)\left(\frac{c}{\sqrt{2}}\right)\left[\left(\frac{H_{\max}-x}{\sqrt{2}\,\sigma_n}\right)e^{-\left(\frac{H_{\max}-x}{\sqrt{2}\,\sigma_n}\right)^2} + \left(\frac{H_{\max}+x}{\sqrt{2}\,\sigma_n}\right)e^{-\left(\frac{H_{\max}+x}{\sqrt{2}\,\sigma_n}\right)^2}\right].$$

Carrying out the differentiation for $\beta(x, s_{nr})$ with respect to $s_{nr}$ and using the definitions supplied above:

$$\frac{d\beta(x, s_{nr})}{ds_{nr}} =$$

$$\sum_{l=1}^{L}\left\{\frac{d}{d\sigma_{nl}}\left[\frac{b_l}{\sqrt{2\pi}\,\sigma_{nl}}e^{-\left(\frac{x-m_l}{\sqrt{2}\,\sigma_{nl}}\right)^2}\right]\left(\frac{d\sigma_{nl}}{d\sigma_n}\right)\left(\frac{d\sigma_n}{ds_{nr}}\right)\right\} =$$

$$\left(\frac{1}{\sqrt{2\pi}\,s_{nr}}\right)\left(\frac{\sigma_n^2}{2}\right)\sum_{l=1}^{L}\left\{b_l e^{-\left(\frac{x-m_l}{\sqrt{2}\,\sigma_{nl}}\right)^2}\left(\frac{1}{\sigma_{nl}^3}\right)\left(1 - \left(\frac{x-m_l}{\sigma_{nl}}\right)^2\right)\right\}.$$

Both terms of the differentiation for the Newton-Raphson correction term numerator have now been found. Setting the numerator equal to zero allows the elimination of one "$s_{nr}$" term, which simplifies the next differentiation for the denominator of the correction term. The notation change is shown as:

$$\left[\frac{d[\tilde{p}_r(x, s_{nr})]}{ds_{nr}}\right]_{s_{nr_{sol}}} = \left[\frac{d[\alpha(x, s_{nr})]}{ds_{nr}}\right]_{s_{nr_{sol}}} + \left[\frac{d[\beta(x, s_{nr})]}{ds_{nr}}\right]_{s_{nr_{sol}}} = 0.$$

Both of the terms have a common leading factor, which can be eliminated, thus:

$$\left[\frac{d[\tilde{p}_r(x, s_{nr})]}{ds_{nr}}\right]_{s_{nr_{sol}}} = \left(\frac{1}{\sqrt{2\pi}\,s_{nr_{sol}}}\right)f1(s_{nr_{sol}}) + \left(\frac{1}{\sqrt{2\pi}\,s_{nr_{sol}}}\right)f2(s_{nr_{sol}}) = 0,$$

which results in the new expression:

$$f(s_{nr}) = f_1(s_{nr}) + f_2(s_{nr}) = \sqrt{2\pi}\,s_{nr}\left[\frac{d[\tilde{p}_r(x, s_{nr})]}{ds_{nr}}\right], \quad \text{where}$$

$$f_1(s_{nr}) = \left(\frac{c}{2}\right)\left[\left(\frac{H_{\max}-x}{\sigma_n}\right)e^{-\frac{1}{2}\left(\frac{H_{\max}-x}{\sigma_n}\right)^2} + \left(\frac{H_{\max}+x}{\sigma_n}\right)e^{-\frac{1}{2}\left(\frac{H_{\max}+x}{\sigma_n}\right)^2}\right], \quad \text{and}$$

$$f_2(s_{nr}) = \left(\frac{\sigma_n^2}{2}\right)\sum_{l=1}^{L}\left\{b_l e^{-\frac{1}{2}\left(\frac{x-m_l}{\sigma_{nl}}\right)^2}\left(\frac{1}{\sigma_{nl}^3}\right)\left(1 - \left(\frac{x-m_l}{\sigma_{nl}}\right)^2\right)\right\}.$$

The denominator of the corrective term now becomes:

$$f'(s_{nr}) = f_1'(s_{nr}) + f_2'(s_{nr}),$$

where $$f_1'(s_{nr}) = \left(\frac{1}{2s_{nr}}\right)\left(\frac{c}{2}\right)\left[\left(\frac{H_{\max}-x}{\sigma_n}\right)e^{-\frac{1}{2}\left(\frac{H_{\max}-x}{\sigma_n}\right)^2}\left\{1 - \left(\frac{H_{\max}-x}{\sigma_n}\right)^2\right\} + \left(\frac{H_{\max}+x}{\sigma_n}\right)e^{-\frac{1}{2}\left(\frac{H_{\max}+x}{\sigma_n}\right)^2}\left\{1 - \left(\frac{H_{\max}+x}{\sigma_n}\right)^2\right\}\right],$$

and $$f_2'(s_{nr}) = \left(\frac{\sigma_n^2}{2s_{nr}}\right)\left(\frac{\sigma_n^2}{2}\right)\sum_{l=1}^{L}b_l e^{-\left(\frac{x-m_l}{\sigma_{nl}}\right)^2}\left(\frac{1}{\sigma_{nl}^3}\right)$$

$$\left\{\left(\frac{1}{\sigma_{nl}^2}\right)\left[3\left(1 - \left(\frac{x-m_l}{\sigma_{nl}}\right)^2\right)^2 - 2\left(\left(\frac{x-m_l}{\sigma_{nl}}\right)^2\right)^2\right] - \frac{2}{\sigma_n^2}\left(1 - \left(\frac{x-m_l}{\sigma_{nl}}\right)^2\right)\right\}.$$

The equations are now fully defined, and the algorithmic modifications can be made. The Newton-Raphson equation is repeated below as the starting point, and depicts the Newton-Raphson method with attractive fixed points at all maxima, minima, and points of inflection for the probability function $\tilde{p}(x, s_{nr})$ thus:

$$s_{nr_{j+1}} + s_{nr_j} - \frac{f(s_{nr_j})}{f'(s_{nr_j})}.$$

The resulting minima have a concave up structure with a positive second derivative of $\tilde{p}_r(x, s_{nr})$, while the maxima have a concave down structure and a negative second derivative. The same holds true for the corresponding portions of a point of inflection in that the side leading up into the point is concave down and the side leading up away from the point is concave up. A simple test prior to the execution of the equation turns the minima into repelling fixed points, while maintaining the maxima as attractive fixed points. Therefore, if $f'(s_{nr_j}) > 0$ (i.e., concave up—minima), then $f'(s_{nr_j}) = -f'(s_{nr_j})$ (i.e., negates the correction direction and pushes away from minima), and $$s_{nr_{j+1}} = s_{nr_j} - \frac{f(s_{nr_j})}{f'(s_{nr_j})}.$$

It was found that the maximum probability algorithm performed better when working with SNR values expressed as decibels rather than ratios. A set of maximum step criteria was established to avoid jumping over maxima without detecting them. A sliding maximum step was used because the areas of these traces that showed little or no activity could tolerate larger steps than those areas with a lot of peaks and valleys, and maximized the efficiency of the algorithm at locating the peaks. The sliding maximum step sizes and their regions of definition are shown in Table I.

TABLE I

| SNR Values | Max Step Size |
|---|---|
| 0–10 dB | 5 dB |
| 10–20 dB | 5 + 1.5 dB |
| 20–30 dB | 5 + 2(1.5) dB |
| 30–40 dB | 5 + 3(1.5) dB |

The maximum step size is multiplied at each pass by a variable that toggles between the values of 1 and 5 $\sqrt[5]{1/2}$=0.8706, which is an empirically determined value. The choice to use roots of ½ as candidates for a suitable step size modification yields conveniently spaced possibilities. A number of other selection methods may also be used. The dual step size technique avoids the situation of the algorithm perpetually spanning the desired maximum point without ever finding it within the SNR range of a given maximum step size. Care is required at the crossover points of the sliding maximum steps that are used; the wrong choice of toggle multiplier can map the larger range exactly into the smaller range and cause algorithm failure.

At the completion of the Newton-Raphson computation, the instantaneous maximum probability SNR estimate for iterate k has been found, thus:

$$\hat{s}_{nr}[k] = s_{nr_{sol}} = s_{nr_{j+1}} : |s_{nr_{j+1}} - s_{nr_j}| < \epsilon, \text{ where } \epsilon \text{ is the desired accuracy.}$$

Figure 7:
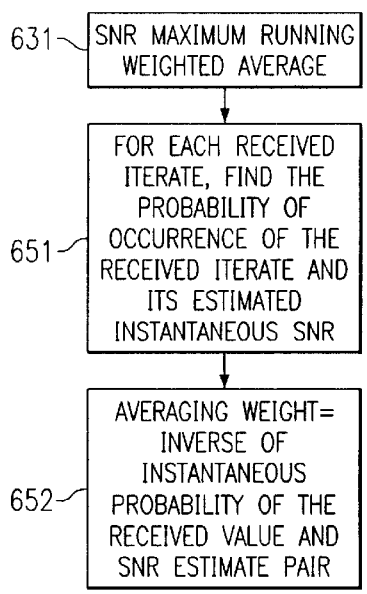
FIG. 7 is a flowchart illustrating the calculation of the weighted running average.

The next step in the receiver estimation engine processing is to calculate the running weighted average in step 631. FIG. 7 shows a flowchart of calculating the SNR running weighted average. Combining the instantaneous SNR estimates on every received iterate into an average value that accurately tracks the true value is accomplished by a running weighted average calculation whose weights are derived from probability computations so the estimated SNR tracks the true SNR closely. The current received iterate and the corresponding instantaneous SNR estimate are processed to find their probability of occurrence in step 651. The bin width w is ignored because it is the same for all bins in the PDF model and contributes nothing to the decision process. Only the bin values of the PDF functions will be used in the weighted averaging process and will be loosely referred to as the probability. For the SNR running weighted average, the SNR is estimated for each received iterate, and the probability of occurrence is found for the (current received value $X_r(k)$ 140, instantaneous SNR value $S_m(k)$ 180) pair.

In order for the estimated SNR to track the true SNR, the averaging weights are defined as the inverse instantaneous probability of the (current received value $X_r(k)$ 140, instantaneous SNR value $S_m(k)$ 180) in step 652, thus:

$$P_i[k] = \bar{p}_r(x_r[k], s_{nr}[k]), \text{ and } w_{av}[k] = 1/P_i[k].$$

Weighting factors must be limited to avoid extremes. Therefore, probability results are artificially limited to values which are not equal to zero, and the maximum weight calculation is limited so that the inverse of low probability values do not swamp the average. Using empirical data, the following were selected, derived from the observed average probability and the averaging window length: $\bar{P}_i$=0.4444 and $w_{max}$=$(1/\bar{P}_i)(W_{ra}/f_w)$, where $W_{ra}$ is the running average window length (L) and $f_w$=3 (an empirical factor found using various combinations of variables). Averaging window lengths of 32 and 64 iterates also proved to provide better estimate tracking. Using these values, the running weighted average SNR locks onto a close estimate of the true SNR within approximately 200 iterates (for a 64-iterate window). Thus, receiver decisions based on the estimator should be ignored until the 200-iterate transient period has passed, after which time data bit recovery may commence. Gradual SNR changes will be tracked on a continual basis, but sharp variations will cause a 200-iterate transient period to occur.

The issues of local versus global instantaneous SNR maximum likelihood detection and algorithm initialization are related. Global detection is desired in the absence of knowledge at estimate algorithm inception, but the average value drives instantaneous peak detection once the averaging window has filled up with globally detected maximum likelihood instantaneous SNR values. This feedback of the current average SNR estimate serves as the initial approximation in the Newton-Raphson root approximation optimization procedure. The average SNR feedback enables the determination of local maxima in the vicinity of the current average SNR estimate after its value has been established via global values, which tends to drive the estimated SNR toward an accurate assessment of the true SNR. Observations of the probability vs. SNR functions led to the empirical initial SNR value of 23 dB for the instantaneous SNR detector Newton-Raphson algorithm during the averaging window initialization, which is located about midway between the lobes of observed double-peak functions, with good mobility toward either higher or lower values for the various observed test data.

The techniques used in this SNR estimator do not require differentiable equations for the probability function to be successful. Standard derivative definition equations could be used in the Newton-Raphson iteration technique where two close values are used with the corresponding function responses, and the second derivative can be found in the same manner. For example:

$$\frac{df(x)}{dx} \cong \frac{f(x_2) - f(x_1)}{x_2 - x_1} \text{ and } \frac{d^2 f(x)}{dx^2} \cong \frac{\frac{df(x_2)}{dx} - \frac{df(x_1)}{dx}}{x_2 - x_1}.$$

It is necessary during the averaging process to find the probability of occurrence for the (current received value $X_r(k)$ 140, instantaneous SNR value $s_m(k)$ 180) pair. This can be done using empirical data rather than closed-form equations by performing an FFT-based fast convolution on the empirical transmit PDF and empirical or modeled channel noise PDF to find the received PDF, from which the bin value corresponding to $x_r[k]$ is the desired probability of occurrence.

The accuracy of the signal level restoration apparatus and method thus depends upon the relative signal power and noise power and is affected by contributions from the two estimate values comprising the signal level calculation. In the first embodiment of the running weighted averager described above, the weights are set to be inversely proportional to the incremental probability of occurrence of the (current received value $X_r(k)$ 140, instantaneous SNR value $s_m(k)$ 180) data pair. This embodiment exhibits a limited range of relatively accurate SNR estimation, bounded by regions of degraded SNR estimation accuracy. The areas of degraded accuracy exert a profound influence on the signal amplitude restoration of chaotic signals with significant noise corruption. A second embodiment arises from the observation that choices of exponents other than negative one result in accurate estimates for certain SNR values, termed their "natural SNR." By way of experimentation, it has been determined that there exists a continuum of natural SNR values for a range of non-standard exponent values.

Further, it is now known that accurate control of the SNR estimate, the estimate variance, and the unstable regions require a second control variable beyond the exponent value. A window within which the product of the instantaneous SNR and the averaging weight must reside was created to avoid excessive contributions from each iterate toward the average SNR calculation. This is a version of a standard technique used in numerical processing that controls the amount of change allowed by each processing decision, such as limiting the step size in an iterative root approximation optimization technique to avoid skipping over waveform features due to the computation of an excessive correction.

Analysis of the weighted average process, $$\bar{x} = \frac{\sum_{l=1}^{L} w_l x_l}{\sum_{l=1}^{L} w_l},$$

suggests that, rather than control the individual weights or averaging variables, it is preferable to window the product in the numerator summation, effectively controlling contributions from both the weight calculation and the averaging variable calculation. When the product exceeds the window limits, the weight is adjusted to bring the product to the window boundary value. This gives a relationship for the instantaneous SNR estimates that yields an accurate average SNR estimate over a significantly extended range of operation.

Although the running weighted average is performed on SNR values measured in dB (decibels), the weight adjustment calculation suffers from the fact that SNR dB values can be negative (violating the property that weights computed from probability values cannot be negative) or zero (values close to zero will result in an excessive modified weight). Since the SNR ratio values can never be negative or zero, a windowing scheme based on the use of such values was sought. The weight values for the weighted averaging process are calculated as a PDF bin value, or incremental probability, raised to a power for each iterate. By way of experimentation, it has been found that the fourth root of each SNR ratio value times the corresponding average of the averaging weights encountered in 100,000-point data runs yields a relatively constant product across the expected SNR range. Thus, an initial value for the window can be calculated as:

$$P_w = \left( \sqrt[n]{\frac{S^{avg}}{N_r}} \right) (w_{avg}^{snr}),$$

where $P_w$ is the window SNR-weight product value, $w_{avg}^{snr}$ is the average of the averaging weights for a given SNR value collected as a priori information and stored in a database, and n=4 is a root of the average SNR estimator ratio value, chosen to suit the performance observed in this design.

Since the dynamics of the apparatus and method change according to the received SNR value (which is dependent on the transmitted power, propagation distance, and channel noise), the window calculation includes a product window scaling factor that results in better control of the SNR estimate stability, accuracy, and variance, especially at low SNR values. The maximum SNR-weight product factor is recorded a priori as a function of SNR, and the window method maximum value is chosen to be: $P_{max} = (P_w)(F_p^{snr})$, where $P_{max}$ is the maximum product value allowed by the window, and $F_p^{snr}$ is the maximum product calculation factor that refines the basic window size for the current average SNR estimate value. Larger window factors exert less control on the natural process dynamics, exhibiting shorter transient regions and better tracking of the changes in the channel SNR. Smaller window factors achieve better control over SNR estimate accuracy, variance, and stability, at the expense of system responsiveness.

Further experimentation led to tabulating the behavior of several variables over a range of SNR values that yielded accurate estimates of each SNR value, with acceptable estimate variance and stability. The exponent for the incremental probability, $\gamma^{snr}$, and the maximum SNR-weight product factor, $F_p^{snr}$, were controlled to achieve the desired response; and the average of the averaging weights, $w_{avg}^{snr}$, was recorded. The values of all variables were determined over a SNR range of 0 dB to 70 dB, in increments of one decibel, as shown in Table II below.

TABLE II

| $\frac{S}{N_{dB}}$ | $\gamma^{snr}$ | $F_p^{snr}$ | $w_{avg}^{snr}$ |
|---|---|---|---|
| 00 | −2.170 | 2.2430 | 16.2080 |
| 01 | −2.159 | 2.2600 | 16.2718 |
| 02 | −2.122 | 2.3050 | 14.7610 |
| 03 | −2.055 | 2.4000 | 12.9465 |
| 04 | −2.025 | 2.5000 | 11.6136 |
| 05 | −2.003 | 2.6500 | 10.6663 |
| 06 | −2.000 | 2.8000 | 10.0041 |
| 07 | −2.008 | 3.0000 | 9.4748 |
| 08 | −2.035 | 4.0000 | 9.2969 |
| 09 | −2.088 | 5.5000 | 9.4639 |
| 10 | −2.115 | 7.5000 | 9.2801 |
| 11 | −2.125 | 9.0000 | 8.9673 |
| 12 | −2.107 | 10.0000 | 8.4266 |
| 13 | −2.059 | 11.0000 | 7.7046 |
| 14 | −1.990 | 12.0000 | 6.9367 |
| 15 | −1.910 | 13.0000 | 6.2144 |
| 16 | −1.770 | 13.8000 | 5.2673 |
| 17 | −1.600 | 14.6000 | 4.3744 |
| 18 | −1.420 | 15.4000 | 3.6298 |
| 19 | −1.374 | 16.2000 | 3.4423 |
| 20 | −1.415 | 17.0000 | 3.5438 |
| 21 | −1.507 | 17.5000 | 3.8298 |
| 22 | −1.561 | 18.0000 | 3.9959 |
| 23 | −1.585 | 18.5000 | 4.0520 |
| 24 | −1.570 | 19.0000 | 3.9668 |
| 25 | −1.415 | 19.5000 | 3.4201 |
| 26 | −1.235 | 19.8000 | 2.8915 |
| 27 | −1.147 | 20.0000 | 2.6606 |
| 28 | −1.080 | 20.0000 | 2.4967 |
| 29 | −1.035 | 19.8000 | 2.3889 |
| 30 | −0.967 | 19.5000 | 2.2419 |
| 31 | −0.926 | 19.1000 | 2.1548 |
| 32 | −0.883 | 18.7000 | 2.0675 |
| 33 | −0.856 | 18.2000 | 2.0127 |
| 34 | −0.766 | 17.7000 | 1.8522 |
| 35 | −0.665 | 17.2900 | 1.6888 |
| 36 | −0.615 | 16.8700 | 1.6110 |
| 37 | −0.595 | 16.6700 | 1.5784 |
| 38 | −0.602 | 16.8000 | 1.5814 |
| 39 | −0.580 | 16.2000 | 1.5454 |
| 40 | −0.559 | 16.1500 | 1.5142 |
| 41 | −0.549 | 15.9800 | 1.5011 |
| 42 | −0.528 | 15.8300 | 1.4769 |
| 43 | −0.497 | 15.8300 | 1.4423 |
| 44 | −0.501 | 15.8000 | 1.4548 |
| 45 | −0.475 | 16.0300 | 1.4303 |
| 46 | −0.440 | 16.4500 | 1.3974 |
| 47 | −0.396 | 16.8500 | 1.3553 |
| 48 | −0.326 | 17.4000 | 1.2880 |
| 49 | −0.250 | 17.9300 | 1.2179 |
| 50 | −0.130 | 18.1700 | 1.1102 |

TABLE II-continued

| $\frac{S}{N_{dB}}$ | $\gamma^{snr}$ | $F_p^{snr}$ | $w_{avg}^{snr}$ |
|---|---|---|---|
| 51 | +0.079 | 18.7100 | 0.93858 |
| 52 | +0.357 | 19.3500 | 0.75111 |
| 53 | +0.597 | 20.4900 | 0.62122 |
| 54 | +0.820 | 23.0000 | 0.52406 |
| 55 | +1.052 | 26.0000 | 0.44081 |
| 56 | +1.285 | 29.0000 | 0.37196 |
| 57 | +1.510 | 32.0000 | 0.31717 |
| 58 | +1.735 | 35.0000 | 0.27167 |
| 59 | +2.050 | 37.5000 | 0.21969 |
| 60 | +2.365 | 39.0000 | 0.17848 |
| 61 | +2.680 | 40.5000 | 0.14606 |
| 62 | +3.005 | 42.0000 | 0.11959 |
| 63 | +3.320 | 43.5000 | 0.09936 |
| 64 | +3.660 | 46.0000 | 0.08272 |
| 65 | +4.000 | 48.5000 | 0.06955 |
| 66 | +4.340 | 51.0000 | 0.05922 |
| 67 | +4.680 | 53.5000 | 0.05098 |
| 68 | +5.050 | 56.5000 | 0.04403 |
| 69 | +5.420 | 59.5000 | 0.03849 |
| 70 | +5.810 | 63.0000 | 0.03402 |

The natural SNR value was deemed acceptable when the actual SNR and estimated SNR agreed to within 0.1 dB. Except for SNR values of 1 dB and 0 dB (which produced 0.291 dB error and 1.288 dB error, respectively), this result was achieved.

The algorithm for SNR estimation proceeds as follows, referencing Table II. The average SNR estimator estimates the previous channel SNR value, $\overline{S}_m(k-1)$ dB. An interpolation calculation finds the corresponding values of $\gamma^{snr}$, $F_p^{snr}$, and $w_{avg}^{snr}$ from Table II. The average SNR in ratio form is:

$$\frac{S^{avr}}{N_r} = 10^{\left(\frac{\overline{S}_m(k-1)}{10}\right)}.$$

The SNR maximum likelihood estimator calculates the current instantaneous SNR value, $S_m(k)$ dB, as:

$$S_m(k) = \frac{S^i}{N_r} = 10^{\left(\frac{S_m(k)}{10}\right)}.$$

The instantaneous SNR value $S_m(k)$ is passed to the received likelihood detector to determine the incremental probability, $p_{inc}$, of the (current received value $X_r(k)$ 140, instantaneous SNR value $S_m(k)$ 180) data pair using the received PDF corresponding to $$\frac{S^i}{N_r}.$$

The instantaneous weight is calculated as $w_i = p_{inc}^{\gamma^{snr}}$, and the window SNR-weight product value $P_{ws}$ is determined as set forth above.

The instantaneous SNR-weight product is calculated as:

$$P_i = \left(\sqrt[n]{\frac{S^i}{N_r}}\right)(w_i).$$

The window limits are tested for containment, meaning that the instantaneous SNR-weight product cannot be greater than the maximum window limit, nor less than the reciprocal of the maximum window limit, and the correct weighting factor to use for the weighted average calculation is found in Table III below. The running weighted average calculation proceeds according to the equation for $\bar{x}$ given above, using $w_{now}$ as the averaging weight along with the instantaneous SNR value $$\frac{S^i}{N_{dB}} = S_m(k).$$

TABLE III

If $P_i > (P_w)(F_p^{snr})$, then $w_{now} = \left(\frac{w_i}{P_i}\right)(P_w)(F_p^{snr})$. Else, if $P_i < \left(\frac{P_w}{F_p^{snr}}\right)$, then $w_{now} = \left(\frac{w_i}{P_i}\right)\left(\frac{P_w}{F_p^{snr}}\right)$. Otherwise, $w_{now} = w_i$.

Figure 8:
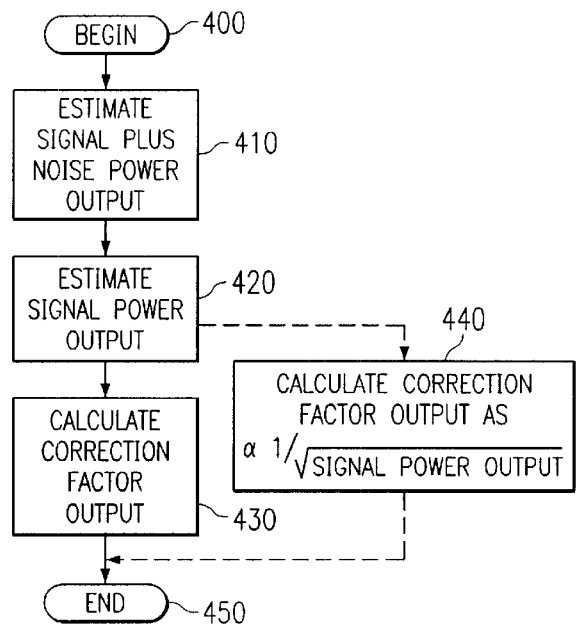
FIG. 8 is a flowchart of the method for providing a correction factor output using a received signal input and an estimated SNR power ratio input.

Turning now to FIG. 8, a flowchart of the overall method for providing a correction factor output can be seen. As described above, the method of providing a correction factor output using a received signal input and an estimated signal-to-noise power ratio input, begins at step 400 and includes estimating a signal plus noise power output as approximately equal to a summation of the received signal input squared over a preselected time interval window in step 410; estimating a signal power output as approximately equal to a product of the signal plus noise power output and the estimated signal-to-noise power ratio input divided by a quantity of one plus the estimated signal-to-noise power ratio in step 420; and calculating the correction factor output as approximately inversely proportional to a square root of the signal power output in step 430. Alternatively, in step 440, the method may continue from step 420 by calculating the correction factor output as approximately equal to a square root of a preselected receiver design power level divided by the square root of the signal power output in step 440. The method for providing a correction factor output ends at step 450.

Figure 9:
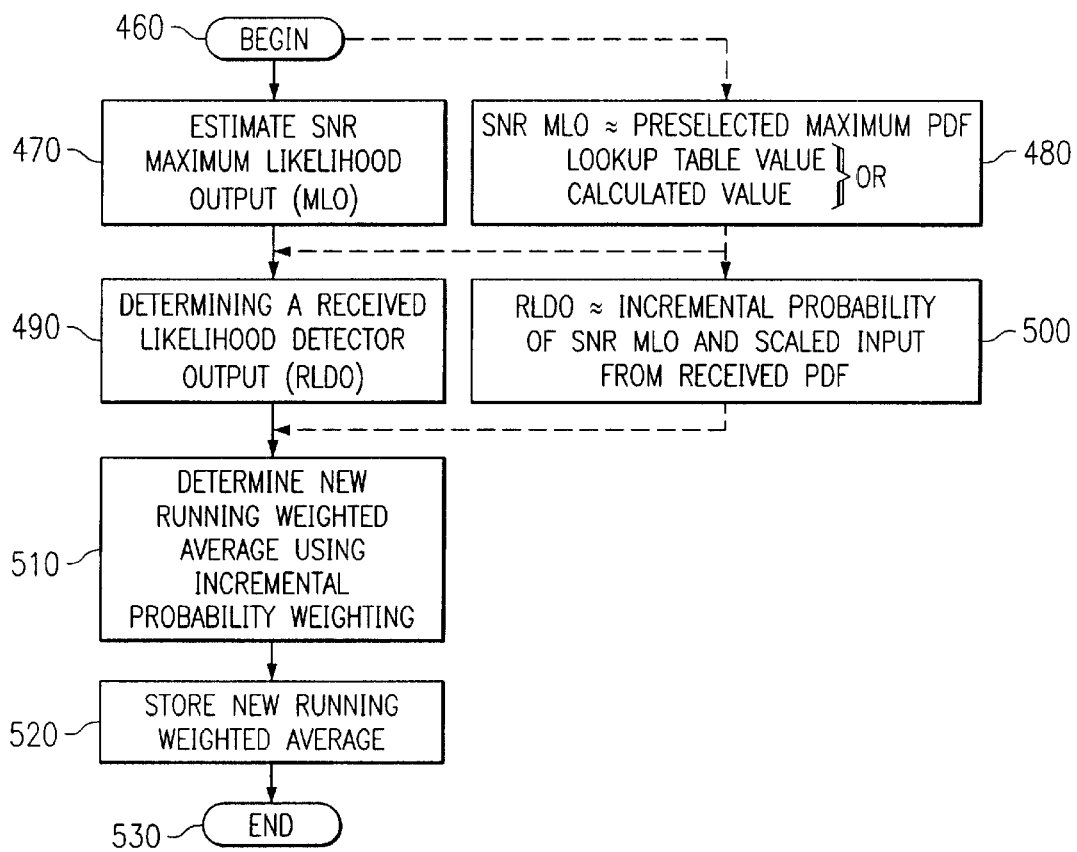
FIG. 9 is a flowchart of the method for providing an average SNR estimate using a scaled input and a stored running weighted average.

FIG. 9 is a flowchart of the overall method for providing an average SNR estimate. As described above, the method begin at step 460, makes use of a scaled input and a stored running weighted average, and includes the steps of estimating a SNR maximum likelihood output using the scaled input and the stored running weighted average at step 470; determining a received likelihood detector output using the scaled input and the SNR maximum likelihood output at step 490; determining a new running weighted average using the received likelihood detector output and the SNR maximum likelihood output, wherein the new running weighted average makes use of a plurality of weight values, and wherein each one of the plurality of weight values is approximately equal to an incremental probability of the SNR maximum likelihood output raised to a preselected power in step 510; and storing the new running weighted average as the average SNR estimate in step 520. The overall method for providing an average SNR estimate ends at step 530.

As shown in step 480, the SNR maximum likelihood output may be selected to be about equal to a preselected maximum Probability Distribution Function (PDF) lookup table value associated with the scaled input and (optionally) the stored running weighted average (to allow for algorithmic implementation of a local maximum from the lookup table) or a maximum Probability Distribution Function (PDF) calculated value associated with the scaled input and the stored running weighted average. The maximum PDF calculated value may be selected to be about equal to a convolution of a transmit PDF model and a channel noise PDF model, wherein the transmit PDF model includes a windowed DC level component and a first plurality of gaussian functions, and wherein the channel noise PDF model includes a second plurality of gaussian functions. As shown in step 500, the received likelihood detector output may be selected to be about equal to an incremental probability of the SNR maximum likelihood output and the scaled input from a received Probability Distribution Function associated with the SNR maximum likelihood output. Typically, the new running weighted average is about equal to the stored running weighted average.

Figure 10:
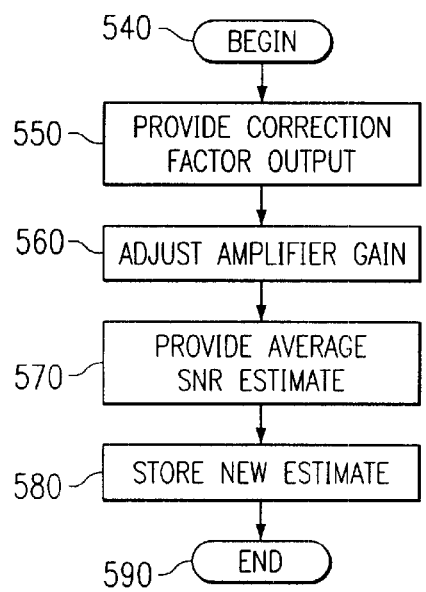
FIG. 10 is a flowchart of the method for providing a level-restored received signal output.

FIG. 10 is a flowchart of the method for providing a level-restored received signal output, and typically makes use of a received signal input, a stored running weighted average, and a preselected receiver design power level. The method begins at step 540, and includes the steps of providing a correction factor output using the received signal input, the preselected receiver design power level, and the stored running weighted average in step 550; adjusting a gain of a variable gain amplifier having an amplifier input operatively connected to the received signal input, and a scaled amplifier output providing the level-restored received signal output in step 560; providing an average SNR estimate using the level-restored received signal output and the stored running weighted average in step 570; and storing the average SNR estimate as a new running weighted average in step 580. The overall method for providing a level-restored received signal output ends at step 590.

Testing of the invention has revealed outstanding estimation accuracy for values of 200 dB gain (−200 dB loss) through 200 dB loss, which is equivalent to the free space transmission loss of a 900 MHz signal at a distance 163,000 miles. The relevant rms accuracy values for 10 dB SNR are about ±0.3 for 50 dB gain, and about +/−0.3 dB for 200 dB loss. Even at 0 dB SNR (which represents the approximate limit of performance for the apparatus and method), using a chaotic transmit signal and window widths of 1024 values for both the running average received signal-plus-noise power estimator and the running weighted average in the SNR estimator, the general offset in the SNR estimate is less than about 1.5 dB. At 200 dB loss, there is an rms accuracy of about ±0.6 dB, with the worst-case error of −2 dB (which is insufficient to cause a loss of chaotic synchronization). Thus, the invention implemented using the design values specified herein achieves amplitude correction accuracies well within the ability of chaotic methods to retain synchronization, all the way through 0 dB SNR, whereas contemporary chaotic communications systems typically lose synchronization at about ±3 dB amplitude variation in a noiseless environment, and less than ±3 dB amplitude variation in the presence of noise. A greater performance range is expected for other design values; in particular, extension to below 0 dB SNR should occur for wider averaging windows.

No algorithmic limits have been observed on the effectiveness of the signal amplitude restoration apparatus and method. As a result, chaotic communications using arbitrary transmit signal amplification levels and propagation path distances is now possible, subject only to the front-end power handling capability of the receiver, and its sensitivity to weak signals.

Although the apparatus and method have been described in relation to nonlinear chaotic transmitted signals, the invention is also applicable to non-chaotic receivers of both linear and nonlinear design. For example, linear receivers using phase-locked loops preceded by a gain stage and a hard limiter typically discard excess signal amplitude produced by the gain stage. The limiter activity tends to change the properties of the input signal, including signal contamination due to noise, and causes the loop behavior to deviate from theoretical performance. However, essentially perfect agreement between theory and practice should be realized using the apparatus and method of the present invention, enabling such benefits as improved loop performance and more effective data recovery in the presence of noise.

In addition, the apparatus and method of the present invention can provide improved automatic gain control (AGC) function, such as that used widely in existing receiver technology. Current AGCs scale the entire received signal (i.e., the signal-plus-noise) to an optimal level for demodulation circuitry operation. The present invention will enable scaling the received signal such that its message signal content, rather than the message signal-plus-noise, is at the optimal level for data recovery. Thus, more accurate communications will result, in accord with the theoretical bounds of various demodulation techniques.

Figure 11:
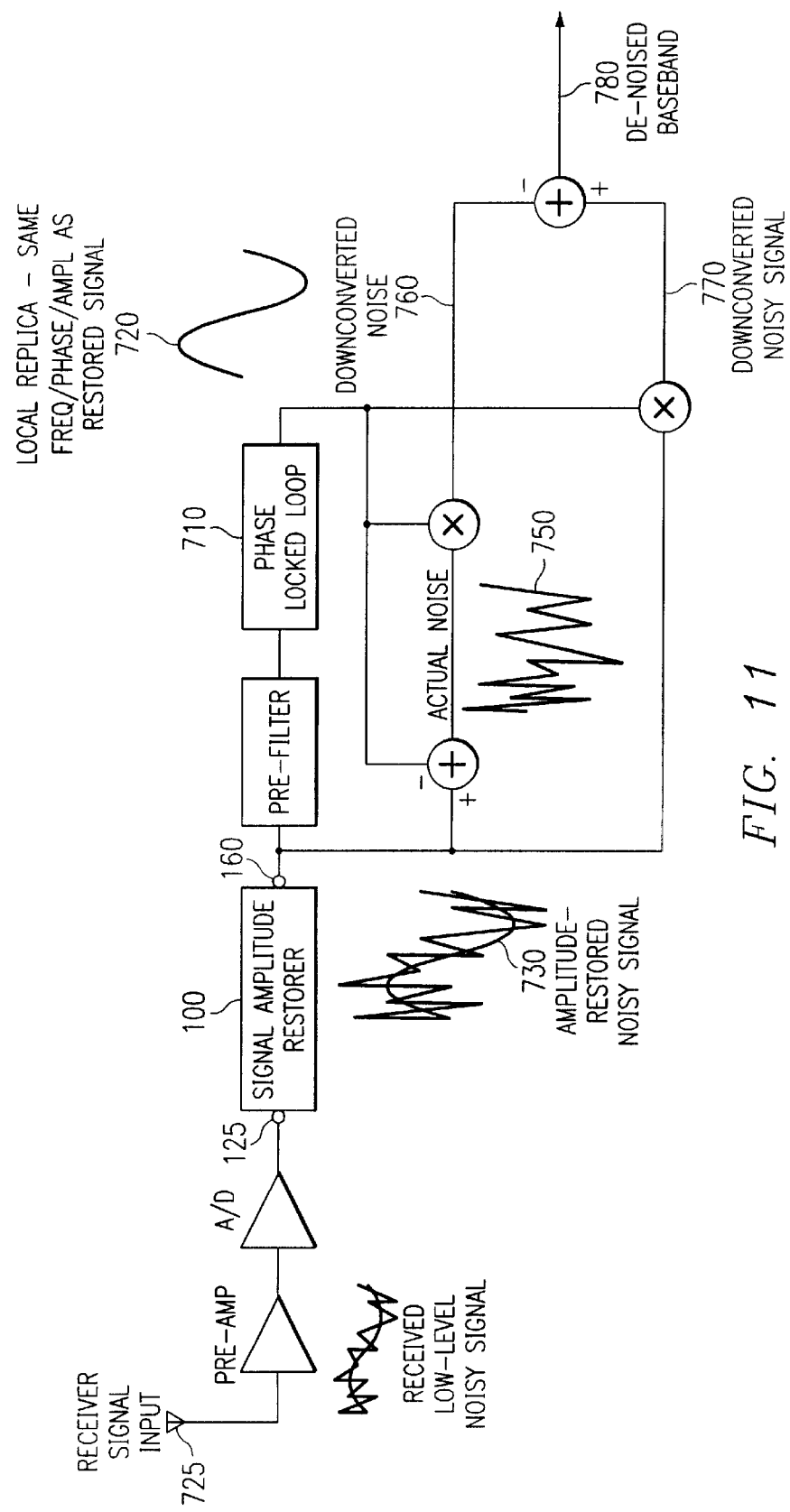
FIG. 11 is a schematic block diagram of a radio receiver incorporating an embodiment of the present invention.

Furthermore, the apparatus and method of the present invention may be applied to enable the detection and subsequent removal of actual noise contamination values imposed upon the received signal in receivers that generate local transmit signal and/or carrier signal replicas. As illustrated in FIG. 11 for the case of carrier replica generation, a common synchronization and timing recovery technique is the use of a phase-locked loop (PLL) 710. The three defining parameters of a sinusoid are amplitude, frequency, and phase. The output of the PLL 710 is a sinusoid of essentially exact frequency and phase as the received carrier, which is a local replica 720 of the carrier sinusoid. The amplitude of the local replica 720, however, will typically not match the amplitude of the received carrier (receiver signal input 725). Consequently, it is currently necessary to use various noise mitigation techniques based on probability arguments to recover the message in a noisy environment.

Referring to FIG. 11, it is shown that preceding the phase-locked loop 710 with the Signal Amplitude Restorer 100 having knowledge of the phase-locked loop design output amplitude, the carrier portion of the received signal can be set to match the PLL-generated sinusoid. This combination yields alignment of all three defining parameters of a sinusoid (amplitude, frequency, and phase) between the received carrier and the local replica 720. A point-by-point subtraction of the amplitude-restored received signal 730 and the local replica 720 produces the actual noise signal contamination 750 on the received message signal. Down-converting both the received signal 770 and the detected noise signal 770 enables removal of the noise from the baseband signal, yielding a de-noised signal 780 for message recovery. Thus, the invention may include a receiver architecture comprising a signal amplitude restoration apparatus providing an amplitude-restored noisy signal from a receiver signal input, wherein the restoration apparatus comprises an amplitude correction factor generator having a received signal input operatively connected to the receiver signal input, an estimated signal-to-noise power ratio input, and a correction factor output, a variable gain amplifier having an amplifier input operatively coupled to the received signal input, a gain adjustment input operatively coupled to the correction factor output, and a scaled amplifier output operatively coupled to the scaled received signal output to provide the amplitude-restored noisy signal, and an average signal-to-noise (SNR) estimator having a scaled input operatively connected to the scaled amplifier output and the scaled received signal output, and an estimated output operatively connected to the estimated signal-to-noise ratio input, a means for providing a local replica signal from the amplitude-restored noisy signal (such as the PLL), a means for subtracting the local replica signal from the amplitude-restored noisy signal to produce a noise contamination signal (such as an inverting input of a summing amplifier), and a means of down-converting the actual noise signal and the amplitude-restored noisy signal to provide a de-noised baseband signal (such as a down-converter, well known in the art).

An example of expected performance can be projected from the Signal Amplitude Restoration results presented herein, where an achieved amplitude match of +/−0.3 dB corresponds to a 7% carrier amplitude mismatch. The noise found by subtraction will, therefore, be about 93% accurate, resulting in a 12 dB effective noise reduction. This translates directly into a 12 dB improvement in signal-to-noise ratio without increasing the signal power, and also into a 12 dB greater dynamic range or sensitivity for a given receiver design. Incorporating the present invention into a receiver will have a corresponding effect on the receiver accuracy, such as bit error rate, the magnitude of which is dependent on the modulation method characteristics. And finally, it should provides 12 dB additional noise immunity and jam resistance from intentional or incidental noise sources.

In summary, this invention is a powerful tool in the arsenal of communication system design. It enables the use of chaotic communications methods unrestricted by transmitter amplification and propagation path loss considerations, and moves the subject of chaotic communications out of the laboratory and into the realm of real-world hardware. It can be used within existing linear and non-linear, non-chaotic receivers as a means of achieving near-optimal automatic gain control for demodulation, and can be used to enhance phase-locked loop performance by eliminating the need for the commonly used hard limiter.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. An amplitude correction factor generator having a received signal input, an estimated signal-to-noise power ratio input, and a correction factor output, comprising:
    a received power estimator having a power estimator input operatively connected to the received signal input, and an estimated signal plus noise power output;
    a message signal power estimator having a signal plus noise power input operatively connected to the estimated signal plus noise power output, a message signal power input operatively connected to the estimated signal-to-noise power ratio input, and an estimated signal power output; and
    a scaling correction factor generator having an estimated signal power input operatively connected to the estimated signal power output and a scaling factor output operatively connected to the correction factor output.

2. The amplitude correction factor generator of claim 1, wherein the estimated signal plus noise power output is about equal to a summation of the received signal squared over a preselected time interval window.

3. The amplitude correction factor generator of claim 1, wherein the estimated signal power output is about equal to the product of the estimated signal plus noise power output and the estimated signal-to-noise power ratio input, divided by a quantity of one plus the estimated signal-to-noise power ratio input.

4. The amplitude correction factor generator of claim 1, wherein the scaling factor output is approximately inversely proportional to a square-root of the estimated signal power output.

5. The amplitude correction factor generator of claim 4, wherein the scaling factor output is about equal to a square root of a preselected receiver design power level divided by the square-root of the estimated signal power output.

6. An average signal-to-noise ratio (SNR) estimator having a scaled input and an estimated signal-to-noise power ratio output, comprising:
    a SNR maximum likelihood estimator having a scaled estimator input operatively coupled to the scaled input, and a maximum likelihood estimated output;
    a received likelihood detector having a scaled detector input operatively coupled to the scaled estimator input and the scaled input, a likelihood detector input operatively coupled to the maximum likelihood estimated output, and a received likelihood detector output;
    a running weighted averager having a detected averager input operatively coupled to the received likelihood detector output, an estimated averager input operatively coupled to the maximum likelihood estimated output and the likelihood detector input, and an estimated averager output; and
    a unit delay element having a unit delay input operatively coupled to the estimated averager output and a unit delay output operatively coupled to the estimated signal-to-noise power ratio output;
    wherein the SNR maximum likelihood estimator has an averaged estimator input, and wherein the unit delay output is operatively coupled to the averaged estimator input.

7. An average signal-to-noise ratio (SNR) estimator having a scaled input and an estimated signal-to-noise power ratio output, comprising:
    a SNR maximum likelihood estimator having a scaled estimator input operatively coupled to the scaled input, and a maximum likelihood estimated output;
    a received likelihood detector having a scaled detector input operatively coupled to the scaled estimator input and the scaled input, a likelihood detector input operatively coupled to the maximum likelihood estimated output, and a received likelihood detector output;
    a running weighted averager having a detected averager input operatively coupled to the received likelihood detector output, an estimated averager input operatively coupled to the maximum likelihood estimated output and the likelihood detector input, and an estimated averager output; and
    a unit delay element having a unit delay input operatively coupled to the estimated averager output and a unit delay output operatively coupled to the estimated signal-to-noise power ratio output;
    wherein the maximum likelihood estimated output is about equal to a preselected maximum Probability Distribution Function (PDF) lookup table value associated with the scaled input and the unit delay output.

8. A signal amplitude restoration apparatus having a received signal input and a scaled received signal output, comprising:

an amplitude correction factor generator having a received signal input, an estimated signal-to-noise power ratio input, and a correction factor output;

a variable gain amplifier having an amplifier input operatively coupled to the received signal input, a gain adjustment input operatively coupled to the correction factor output, and a scaled amplifier output operatively coupled to the scaled received signal output; and an average signal-to-noise ratio (SNR) estimator having a scaled input operatively connected to the scaled amplifier output and the scaled received signal output, and an estimated output operatively connected to the estimated signal-to-noise power ratio input.

9. The signal amplitude restoration apparatus of claim 8, wherein the amplitude correction factor generator comprises:

a received power estimator having a power estimator input operatively connected to the received signal input, and an estimated signal plus noise power output;

a message signal power estimator having a signal plus noise power input operatively connected to the estimated signal plus noise power output, a message signal power input operatively connected to the estimated signal-to-noise power ratio input, and an estimated signal power output; and a scaling correction factor generator having an estimated signal power input operatively connected to the estimated signal power output and a scaling factor output operatively connected to the correction factor output.

10. The signal amplitude restoration apparatus of claim 8, wherein the average SNR estimator comprises:

a SNR maximum likelihood estimator having a scaled estimator input operatively coupled to the scaled input, and a maximum likelihood estimated output;

a received likelihood detector having a scaled detector input operatively coupled to the scaled estimator input and the scaled input, a likelihood detector input operatively coupled to the maximum likelihood estimated output, and a received likelihood detector output;

a running weighted averager having a detected averager input operatively coupled to the received likelihood detector output, an estimated averager input operatively coupled to the maximum likelihood estimated output and the likelihood detector input, and an estimated averager output; and a unit delay element having a unit delay input operatively coupled to the estimated averager output and a unit delay output operatively coupled to the amplitude correction factor generator.

11. The average SNR estimator of claim 10, wherein the SNR maximum likelihood estimator has an averaged estimator input, and wherein the unit delay output is operatively coupled to the averaged estimator input.

12. The average SNR estimator of claim 11, wherein the maximum likelihood estimated output is about equal to a preselected maximum Probability Distribution Function (PDF) lookup table value associated with the scaled input and the unit delay output.

13. A method of providing a correction factor output using a received signal input and an estimated signal-to-noise power ratio input, comprising the steps of:

estimating a signal plus noise power output as approximately equal to a summation of the received signal input squared over a preselected time interval window;

estimating a signal power output as approximately equal to a product of the signal plus noise power input and the estimated signal-to-noise power ratio input divided by a quantity of one plus the estimated signal-to-noise power ratio; and calculating the correction factor output as approximately inversely proportional to a square root of the signal power output.

14. The method of claim 13, wherein the step of calculating the correction factor output as approximately inversely proportional to the square root of the signal power output includes the step of calculating the correction factor output as approximately equal to a square root of a preselected receiver design power level divided by the square root of the signal power output.

15. A method of providing an average signal-to-noise ratio (SNR) estimate using a scaled input, comprising the steps of:

estimating a SNR maximum likelihood output using the scaled input;

determining a received likelihood detector output using the scaled input and the SNR maximum likelihood output;

determining a new running weighted average using the received likelihood detector output and the SNR maximum likelihood output, wherein the new running weighted average makes use of a plurality of weight values, and wherein each one of the plurality of weight values is approximately equal to an incremental probability of the SNR maximum likelihood output raised to a preselected power; and storing the new running weighted average as the average SNR estimate;

wherein the step of estimating a SNR maximum likelihood output using the scaled input includes the step of estimating the SNR maximum likelihood output using the stored running weighted average.

16. The method of claim 15, wherein the SNR maximum likelihood output is about equal to a preselected maximum Probability Distribution Function (PDF) lookup table value associated with the stored running weighted average.

17. The method of claim 15, wherein the SNR maximum likelihood output is about equal to a maximum Probability Distribution Function (PDF) calculated value associated with the stored running weighted average.

18. The method of claim 15, wherein the new running weighted average is about equal to the stored running weighted average.

19. A method of providing a level-restored received signal output using a received signal input, a stored running weighted average, and a preselected receiver design power level, comprising the steps of:

providing a correction factor output using the received signal input and the stored running weighted average;

adjusting a gain of a variable gain amplifier having an amplifier input operatively connected to the received signal input, and a scaled amplifier output providing the level-restored received signal output;

providing an average signal-to-noise ratio (SNR) estimate using the level-restored received signal output; and storing the average SNR estimate as a new running weighted average.

20. The method of claim 19, wherein the step of providing a correction factor output using a received signal input and the stored running weighted average, comprises the steps of:

estimating a signal plus noise power output as approximately equal to a summation of the received signal input squared over a preselected time interval window;

estimating a signal power output as approximately equal to a product of the signal plus noise power output and the stored running weighted average divided by a quantity of one plus the stored running weighted average; and calculating the correction factor output as approximately inversely proportional to a square root of the signal power output.

21. The method of claim 20, wherein the step of calculating the correction factor output as approximately inversely proportional to the square root of the signal power output includes the step of calculating the correction factor output as approximately equal to a square root of a preselected receiver design power level divided by the square root of the signal power output.

22. The method claim 19, wherein the step of providing an average signal-to-noise ratio (SNR) estimate using the level-restored received signal output comprises the steps of:

estimating a SNR maximum likelihood output using the level-restored received signal output;

determining a received likelihood detector output using the level-restored received signal output and the SNR maximum likelihood output; and determining a new running weighted average using the received likelihood detector output and the SNR maximum likelihood output, wherein the new running weighted average makes use of a plurality of weight values, and wherein each one of the plurality of weight values is approximately equal to an incremental probability of the SNR maximum likelihood raised to preselected power.

23. The method of claim 19, wherein the step of providing an average signal-to-noise ratio (SNR) estimate using the level-restored received signal output includes the step of providing an average SNR estimate using the level-restored received signal output and the stored running weighted average.

24. The method claim 19, wherein the step of providing an average signal-to-noise ratio (SNR) estimate using the level-restored received signal output, comprises the steps of:

estimating a SNR maximum likelihood output using the level-restored received signal output and the stored running weighted average;

determining a received likelihood detector output using the level-restored received signal output and the SNR maximum likelihood output; and determining a new running weighted average using the received likelihood detector output and the SNR maximum likelihood output, wherein the new running weighted average makes use of a plurality of weight values, and wherein each one of the plurality of weight values is approximately equal to an incremental probability of the SNR maximum likelihood raised to a preselected power.

25. A receiver architecture, comprising:

a signal amplitude restoration apparatus providing an amplitude-restored noisy signal from a receiver signal input, wherein the restoration apparatus comprises:

an amplitude correction factor generator having a received signal input operatively connected to the receiver signal input, an estimated signal-to-noise power ratio input, and a correction factor output;

a variable gain amplifier having an amplifier input operatively coupled to the received signal input, a gain adjustment input operatively coupled to the correction factor output, and a scaled amplifier output; and an average signal-to-noise (SNR) estimator having a scaled input operatively connected to the scaled amplifier output, and an estimated output operatively connected to the amplitude correction factor generator;

a means for providing a local replica signal from the amplitude-restored noisy signal;

a means for subtracting the local replica signal from the amplitude-restored noisy signal to produce an actual noise signal; and a means of down-converting the actual noise signal and the amplitude-restored noisy signal and combining them to provide a de-noised baseband signal.

26. The receiver architecture of claim 25, wherein the means to provide the local replica signal is a phase-locked loop.

27. The signal amplitude restoration apparatus of claim 25, wherein the amplitude correction factor generator comprises:

a received power estimator having a power estimator input operatively connected to the received signal input, and an estimated signal plus noise power output;

a message signal power estimator having a signal plus noise power input operatively connected to the estimated signal plus noise power output, a message signal power input operatively connected to the estimated signal-to-noise power ratio input, and an estimated signal power output; and a scaling correction factor generator having an estimated signal power input operatively connected to the estimated signal power output and a scaling factor output operatively connected to the correction factor output.

* * * * *